United States Patent
Matsuo et al.

(10) Patent No.: US 8,073,082 B2
(45) Date of Patent: Dec. 6, 2011

(54) MIRROR SUB-CARRIER DEMODULATION CIRCUIT, RECEIVING DEVICE WITH THE SAME, AND MIRROR SUB-CARRIER DEMODULATING METHOD

(75) Inventors: Shojiro Matsuo, Fukuoka (JP);
Kazunori Hayashi, Fukuoka (JP);
Masakazu Hoashi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 635 days.

(21) Appl. No.: 12/244,995

(22) Filed: Oct. 3, 2008

(65) Prior Publication Data

US 2009/0097594 A1   Apr. 16, 2009

(30) Foreign Application Priority Data

Oct. 5, 2007   (JP) ............................. P.2007-261750
Oct. 9, 2007   (JP) ............................. P.2007-263112

(51) Int. Cl.
*H04L 27/06* (2006.01)
(52) U.S. Cl. ...................................... 375/340
(58) Field of Classification Search ................ 375/324, 375/326, 340, 342–343; 370/503, 509
See application file for complete search history.

(56) References Cited

U.S. PATENT DOCUMENTS

| | | | | |
|---|---|---|---|---|
| 5,737,361 A * | 4/1998 | Park et al. | | 375/149 |
| 5,917,850 A | 6/1999 | Fujita et al. | | |
| 5,995,571 A * | 11/1999 | Inuzuka | | 375/367 |
| 6,160,838 A * | 12/2000 | Shinohara et al. | | 375/130 |
| 6,501,807 B1 | 12/2002 | Chieu et al. | | |
| 6,567,482 B1 * | 5/2003 | Popovic' | | 375/343 |
| 7,227,834 B1 * | 6/2007 | Barton et al. | | 370/208 |
| 7,324,601 B2 * | 1/2008 | Kim | | 375/260 |
| 2008/0274709 A1 | 11/2008 | Goto | | |

FOREIGN PATENT DOCUMENTS

JP   8-335892   12/1996

* cited by examiner

*Primary Examiner* — Khanh C Tran
(74) *Attorney, Agent, or Firm* — Greenblum & Bernstein, P.L.C.

(57) ABSTRACT

A mirror sub-carrier demodulation circuit includes a waveform generation unit, which generates a composite waveform of received I and Q signals, and a peak detection unit, which detects peak values of the composite waveform generated by the waveform generation unit. The demodulation circuit also includes a peak interval detection unit, which detects an interval of the peak values detected by the peak detection unit and generates timing at which the received data is input. The demodulation further includes a temporary storage unit, which stores I data and Q data at the timing generated by the peak interval detection unit, a calculation unit, which performs a correlation calculation using the I data and the Q data of the temporary storage unit acquired during a 1-bit period on the basis of a setting value M of a mirror sub-carrier, and a data determination unit, which determines data of 0 or 1 from the result calculated by the calculation unit.

15 Claims, 19 Drawing Sheets

(1) PREAMBLE (BURST PORTION), PILOT TONE (2) PREAMBLE (BURST PORTION), IQ COMPOSITE WAVEFORM OF PILOT TONE (3) PREAMBLE(M=2)

(I1, Q1) (I4, Q4)

(I2, Q2) (I3, Q3)

DEMODULATION DATA     1     0     1     1     1

(4) PREAMBLE(M=2)

↓ DATA ACQUIRING TIMING

DEMODULATION DATA     1     0     1     1     1

(1) DETECTION IN EVERY FRAME (2) DETECTION IN EVERY QUERY

IN CASE OF M=2

(DATA OF 0)

SAMPLING CLOCK ↑ ↑ ↑ ↑

(DATA OF 1)

SAMPLING CLOCK ↑ ↑ ↑ ↑

IN CASE OF M=4

(DATA OF 0)

(DATA OF 1)

IN CASE OF M=8

(DATA OF 0)

(DATA OF 1)

0 OR 1 DETERMINATION WITH LENGTH OF POSITIVE OR NEGATIVE DATA

0 OR 1 DETERMINATION WITH INTERVAL CROSSING THRESHOLD

WAVEFORM IN ENVIRONMENT OF NOISE AND MULTI PATHS (a)

(b)

(a) WAVEFORM IN NOISE ENVIRONMENT ACCORDING TO THE INVENTION (b) WAVEFORM IN MULTI-PATH ENVIRONMENT ACCORDING TO THE INVENTION

MIRROR SUB-CARRIER DEMODULATION CIRCUIT, RECEIVING DEVICE WITH THE SAME, AND MIRROR SUB-CARRIER DEMODULATING METHOD

BACKGROUND

1. Field of the Invention

The present invention relates to a process of demodulating received data in a communication technique such as UHF RFID (Radio Frequency Identification) carried out using protocols defined by EPC global, and particularly to a mirror sub-carrier demodulation circuit capable of receiving and demodulating data of a mirror sub-carrier transmitted from a tag and a receiving device including the mirror sub-carrier demodulation circuit.

2. Description of the Related Art

In the past, a method described below (Patent Document 1) was is disclosed as a method of demodulating an RFID. FIG. 16 is a diagram illustrating a hardware configuration of a receiving unit in RFID communication. In FIG. 16, Reference Numeral 1601 denotes an antenna receiving an UHF RFID wireless signal. Reference Numeral 1602 denotes an RF receiving unit which converts a received RF signal into an analog electric signal and includes a band pass filter, an LNA, and the like. Reference Numeral 1603 denotes a down-converter that performs a down-convert from the analog RF signal to an in-phase signal (I signal) and a quadrature signal (Q Signal) of a base-band subjected to the down-convert. The base-band signal subjected to the down-convert has a waveform illustrated in FIG. 17(a). Depending on the configuration of the RF receiving unit 1602, the waveform becomes a sine-like waveform illustrated in FIG. 17(b). Reference Numeral 1604 denotes an AD converter that converts the analog I and Q signals of the base-band signal into a digital signal. Reference Numeral 1605 denotes a demodulation circuit that demodulates data from the digitized reception signal. According to Patent Document 1, the RF receiving unit 1602 receives the wireless signal, the down-converter 1603 converts the analog I and Q signals of the base-band, the AD converter 1604 converts and samples the waveform of the I and Q signals into digital data. The modulation circuit 1605 determines and demodulates data of 0 or 1 in the I and Q signals by the number (length of positive data) of continuous positive data and the number (length of negative data) of continuous negative data in the data sampled as in FIG. 18. When the demodulation result of the I signal is different from the demodulation result of the Q signal, there is disclosed the fact that the result obtained by demodulating a side having a larger signal intensity is used.

Patent Document 1: U.S. Pat. No. 6,501,807

However, in the known modulation method, when a large pulse noise occurs in a much noise environment, there occurs a problem in that the sign of sampling data is changed and there is a high possibility of erroneously determining 1-bit data.

Moreover, since it is necessary to severally demodulate the I and Q signals, there occurs a problem in that the size of a circuit increases.

In an RFID demodulation circuit, a demand for surely demodulating more tag information in any environment increases.

SUMMARY

An object of the invention is to provide a mirror sub-carrier demodulation circuit capable of more surely demodulating data received from a communication opponent even under an environment of a noise and interference of other devices and a receiving device including the mirror sub-carrier demodulation circuit.

According to an aspect of the invention, data of a mirror sub-carrier is received, the peaks of a composite waveform of I and Q signals are detected, acquisition timing of symbol data is set from the detected peaks, I data and Q data are input and stored at the set acquisition timing as the symbol data, a correlation calculation is performed on the basis of a setting value M using the plurality of symbol data during a 1-bit period, and 0 or 1 of 1-bit data is determined.

With such a configuration, a demodulation process can be performed when the data at the detected peaks are surely acquired. Accordingly, since an influence of a noise occurring in timing other than the timing for acquiring the symbol data can be reduced, it is possible to surely demodulate data received from a tag even under the environment of the noise or the interference of other devices.

The invention has a configuration in which data of a mirror sub-carrier is received, the peaks of a composite waveform of I and Q signals are detected, detection timing of symbol data is set from the detected peaks, I data and Q data are input and stored at the set detection timing as the symbol data, a correlation calculation is performed on the basis of a setting value M using the plurality of symbol data during a 1-bit period, and 0 or 1 of 1-bit data is determined. With such a configuration, a demodulation process can be performed when the data at the detected peaks are surely acquired. Accordingly, since an influence of a noise occurring in timing other than the timing for acquiring the symbol data can be reduced, it is possible to realize a mirror sub-carrier demodulation circuit capable of more surely demodulating data received from a tag even under the environment of the noise or the interference of other devices.

DETAILED DESCRIPTION

Hereinafter, preferred embodiments of the invention will be described with reference to the drawings. In addition, the plural embodiments described below may be used in description related to each other.

First Embodiment

Figure 1:
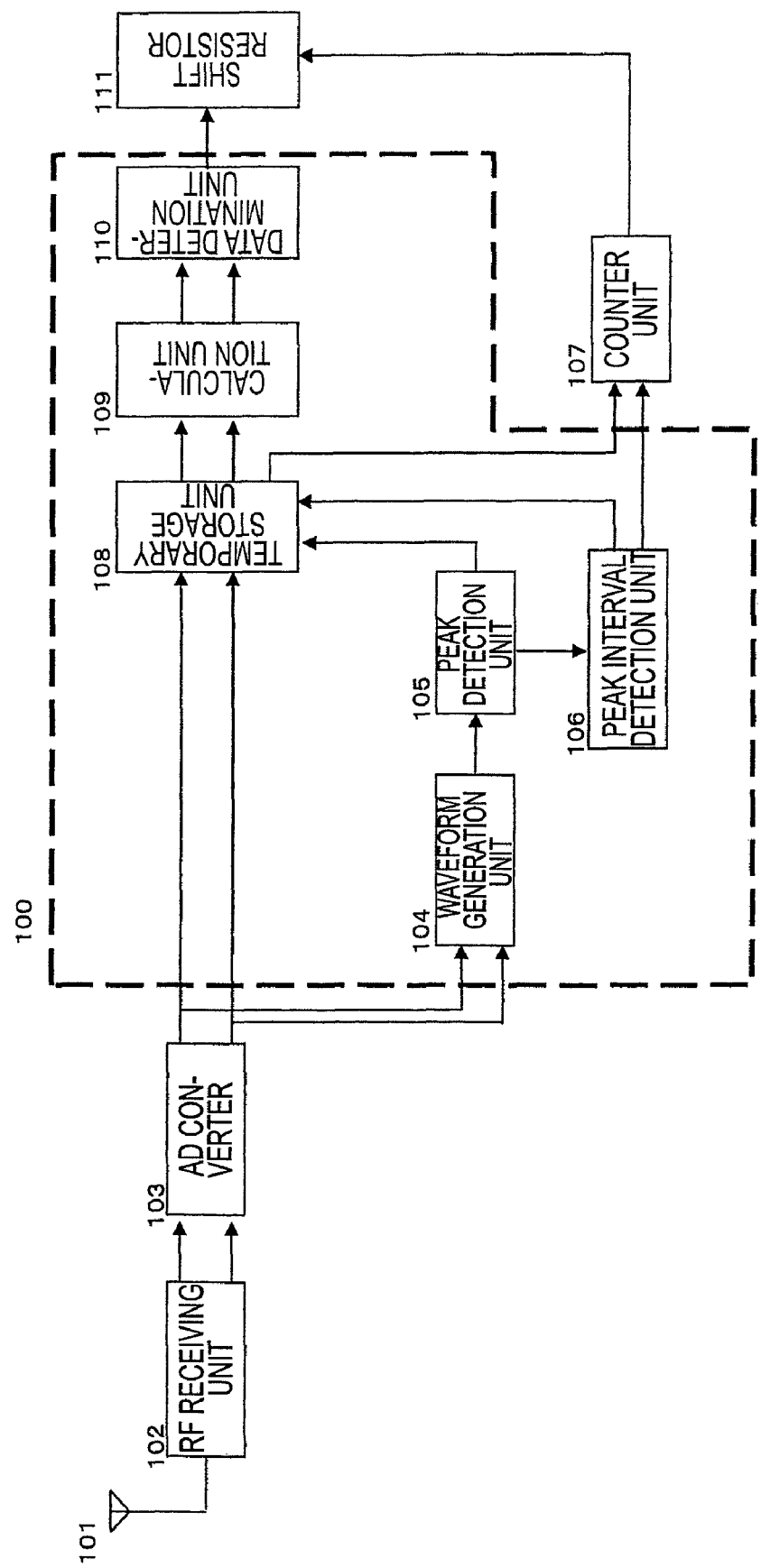
FIG. 1 is a diagram illustrating the configuration of an RFID demodulation circuit according to a first embodiment of the invention.

FIG. 1 is a diagram illustrating the configuration of an RFID demodulation circuit according to a first embodiment of the invention. There is illustrated the RFID demodulation circuit of a receiving device which receives and demodulates data of a mirror sub-carrier from a tag as a communication opponent.

In FIG. 1, Reference Numeral 100 denotes a mirror sub-carrier demodulation circuit. Reference Numeral 101 denotes an antenna that receives UHF RFID wireless signals. Reference Numeral 102 denotes an RF receiving unit which converts the received RF signal received by the antenna 101 into an analog electric signal of I and Q signals and includes a quadrature demodulator, an analog filter, and the like, Reference Numeral 103 denotes an AD converter that converts the analog I and Q signals converted by the RF receiving unit 102 into a digital signal.

Reference Numeral 104 denotes a waveform generation unit that generates a composite waveform of the digital I and Q signals converted by the AD converter 103. Reference Numeral 105 denotes a peak detection unit that detects peak values of the composite waveform of the I and Q signals generated by the waveform generation unit 104, Reference Numeral 106 denotes a peak interval detection unit that detects the interval of the peak values of the composite waveform detected by the peak detection unit 105 and generates timing used to input the received data.

Reference Numeral 107 denotes a counter unit that counts the number of the acquired symbol data. Reference Numeral 108 denotes a temporary storage unit which latches I data and Q data at the timing set by the peak interval detection unit 106 and temporarily stores the latched I data and Q data Reference Numeral 109 denotes a calculation unit which performs a correlation calculation on the acquired I data and Q data on the basis of a setting value M of the mirror sub-carrier. Reference Numeral 110 denotes a data determination unit which determines data of 0 or 1 from the result of the correlation calculation of the plurality of symbol data performed by the calculation unit 109. Reference Numeral 111 denotes a shift resistor that sequentially stores 1-bit data determined by the data determination unit 110.

By transmitting the acquired data from the shift resistor 111 to a CPU or the like (not shown), receiving the incoming data is completed.

Operations of the RFID demodulation circuit having the above-described configuration will be described.

Figure 2:
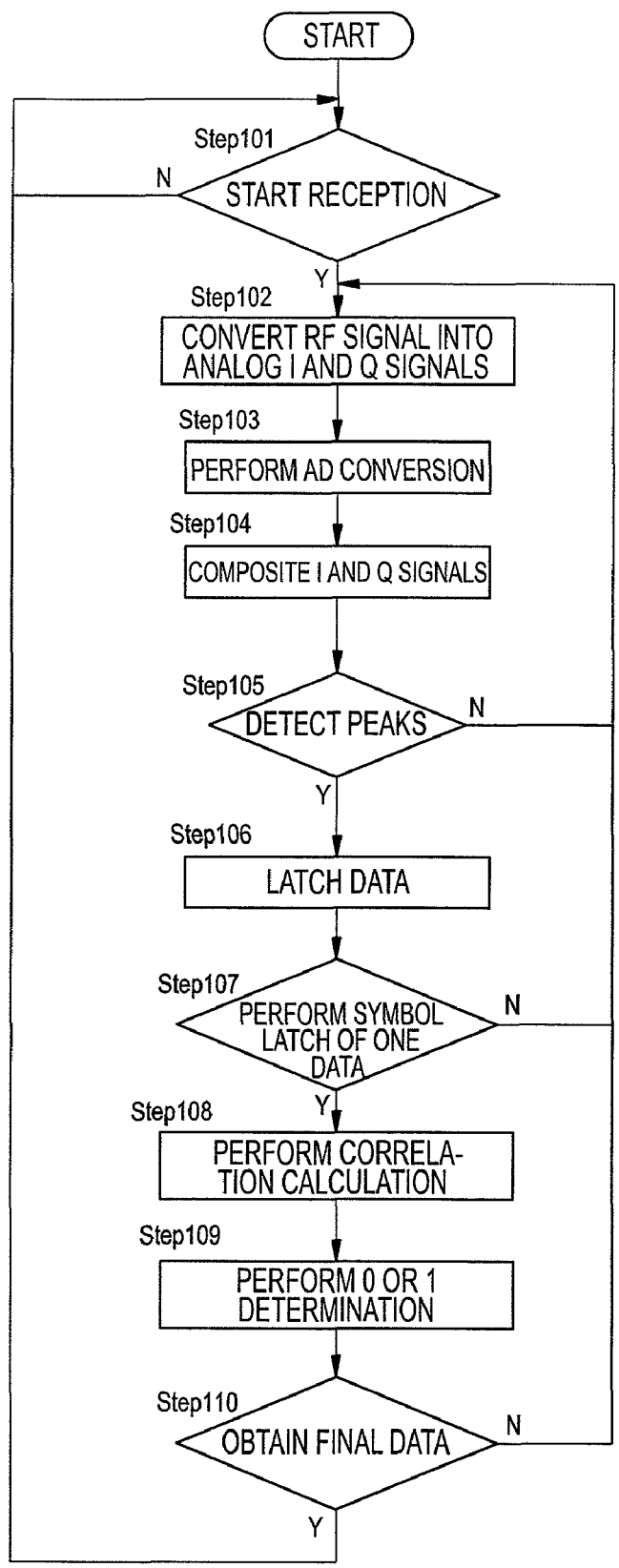
FIG. 2 is a flowchart illustrating operations of the RFID demodulation circuit according to the first embodiment of the invention.
Figure 3:
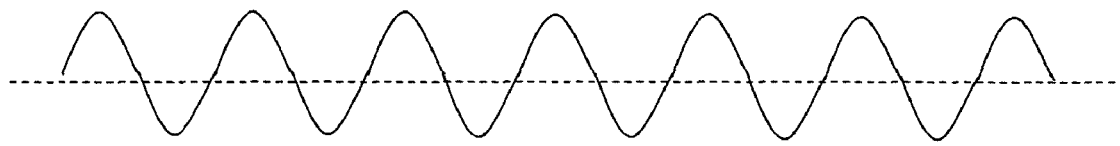
FIG. 3 (1), (2), (3), (4) are diagrams illustrating a waveform of received data according to the first embodiment of the invention.
Figure 3:
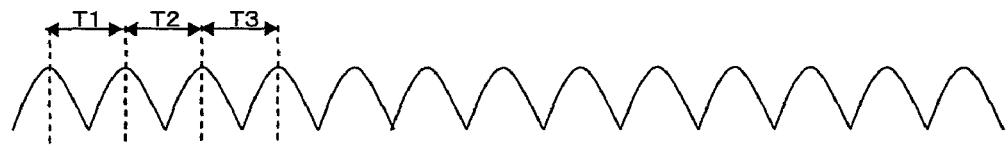
Figure 3:
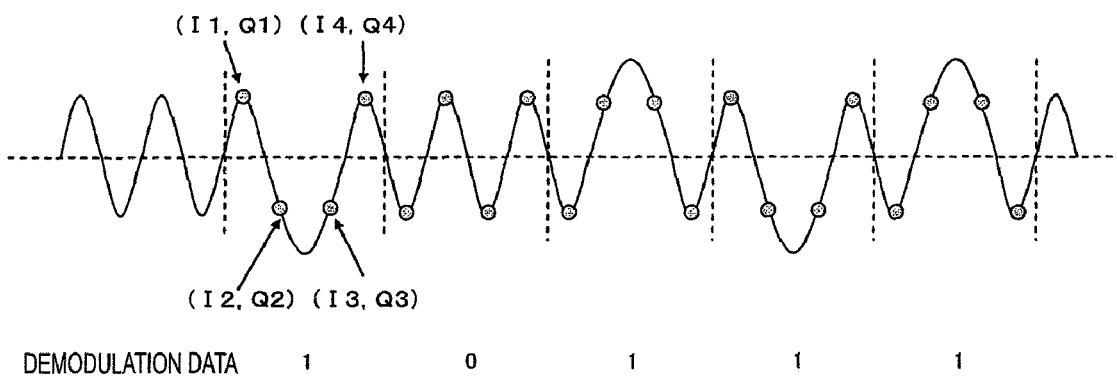
Figure 3:
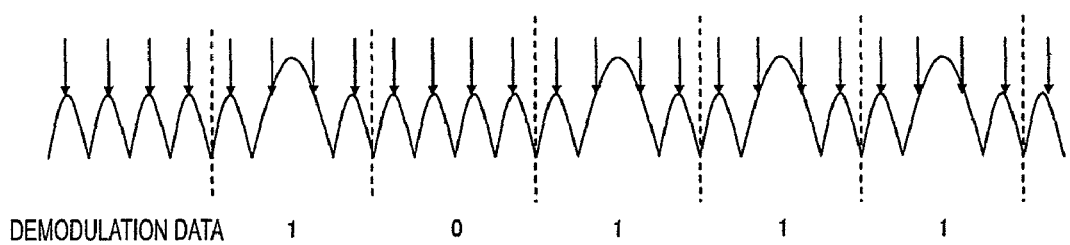

FIG. 2 is a flowchart illustrating the operations of the RFID demodulation circuit according to the first embodiment of the invention. FIG. 3 is a diagram illustrating signal waveforms of the received data according to the first embodiment of the invention. The vertical axis represents a voltage value and the horizontal axis represents time.

FIG. 3(1) shows a signal waveform of a burst signal or a pilot tone added in the first half of a preamble of the I or Q signal, which is output from the RF receiving unit 102. FIG. 3(2) shows a composite waveform of the I and Q signals in FIG. 3(1). FIG. 3(3) shows a preamble waveform of the I or Q signal when the setting value M=2. FIG. 3(4) shows a composite waveform of the preamble waveform in FIG. 3(3).

As illustrated in FIG. 2, the RFID demodulation circuit first transmits a command to a tag. When the reception of the RF signal is enabled (Step 101), the RF signal received by the antenna 101 is converted into the analog electric signal (see FIG. 3(1)) by the RF receiving unit 102 (Step 102), and then the analog electric signal is converted into the digital signal by the AD converter 103 (Step 103).

On the assumption that the I data and Q data which are digitized and sampled at equal timing are In and Qn, respectively, the I data and the Q data are composited to data of $In^2+Qn^2$ by the waveform generation unit 104 to generate the composite waveform of the I and Q signals (see FIG. 3(2)) (Step 104). Then, the peak values of the composite waveform (FIG. 3(2)) are detected by the peak detection unit 105.

The I data and the Q data may be composited to $|In|+|Qn|$ to make a simpler circuit configuration, or may be composited to $|In+In+1|+|Qn+Qn+1|$ to generate a composite waveform in which a noise added to the signal is reduced.

As for the detection of the peak values, at least two sampling data are temporarily stored at normal time and time at which variation in values of the two continuous sampling data is turned from increase to decrease is set to a peak value. Alternatively, three or more sampling data may temporarily be stored and time at which values of sampling data of three or more continuous numbers continuously increase and then values of sampling data of three or more continuous numbers continuously decrease may be set to a peak value. In this way, it is possible to reduce erroneous detection of the peaks caused due to a pulse noise or the like.

When the peak detection unit 105 detects the peak values, an interval between one peak value and the next peak value is counted as a sampling frequency. In addition, when peak intervals between continuous arbitrary numbers are detected to be within an arbitrary difference, an average value T of the intervals is set to a timing interval for inputting data.

For example, it is assumed that intervals (sampling count number between a peak and the next peak) between four continuous peaks are T1, T2, and T3, respectively, and a tolerance value of a difference between the respective values is two sampling counts as in FIG. 3(2). When differences T1−T2, T2−T3, and T1−T3 between the intervals satisfies inequalities of $|T1-T2|\leq 2$, $|T2-T3|\leq 2$, and $|T1-T3|\leq 2$, the peak interval T is set to an average $T=(T1+T2+T3)/3$.

Setting the peak interval T is performed by adding a burst signal or a pilot tone in the first half of the preamble and detecting the peaks within time of the pilot tone.

When the peak interval T is set, the peaks are detected between the previous and next arbitrary counts with reference to the peak interval T in consideration of the tolerance difference of the waveform. For example, when the arbitrary count number is three, the peaks between T−3 and T+3 of the counters of the peak interval detection unit are detected by the peak detection method described above.

When the peaks are detected as in FIG. 3(4), 1-bit I data and Q data are stored at the detection timing in the temporary storage unit 108. When no peak is detected until the count T, the I data and the Q data are temporarily input and stored at the count T. When no peak is detected until the count T+3, the value is set to one symbol data. Alternatively, when the peak is detected until the count T+3 (Step 105), the I data and the Q data are input at the detection timing and stored as one symbol data in the temporary storage unit 108 (Step 106).

The counter of the peak interval detection unit 106 is reset when the count is T or the peak is detected. The number of a data input process is counted by the counter unit 107. In the mirror sub-carrier communication of the setting value M=2, four symbol data are stored in the temporary storage unit 108 (Step 107).

On the assumption that the four symbol data of the I data and the four symbol data of the Q data are I1, I2, I3, I4, Q1, Q2, Q3, and Q4 in input sequence (FIG. 3(3)), the calculation unit 109 performs a correlation calculation with a correlation calculation expression (I1−I2)(I3−I4)+(Q1−Q2)(Q3−Q4) using the four symbol data of the I data and the four symbol data of the Q data (Step 108). When a MSB (Most Significant Bit) of the calculation result is 1, it is determined that the 1-bit data is 1. When the MSB of the calculation result is 0, it is determined that the 1-bit data is 0 (Step 109).

Figure 18:
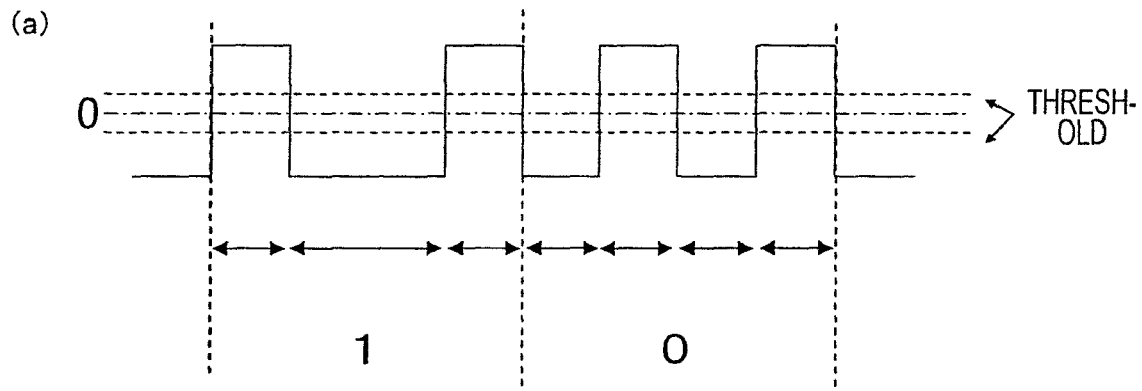
FIG. 18 (a), (b) are diagrams for explaining a conventional demodulation method.
Figure 18:
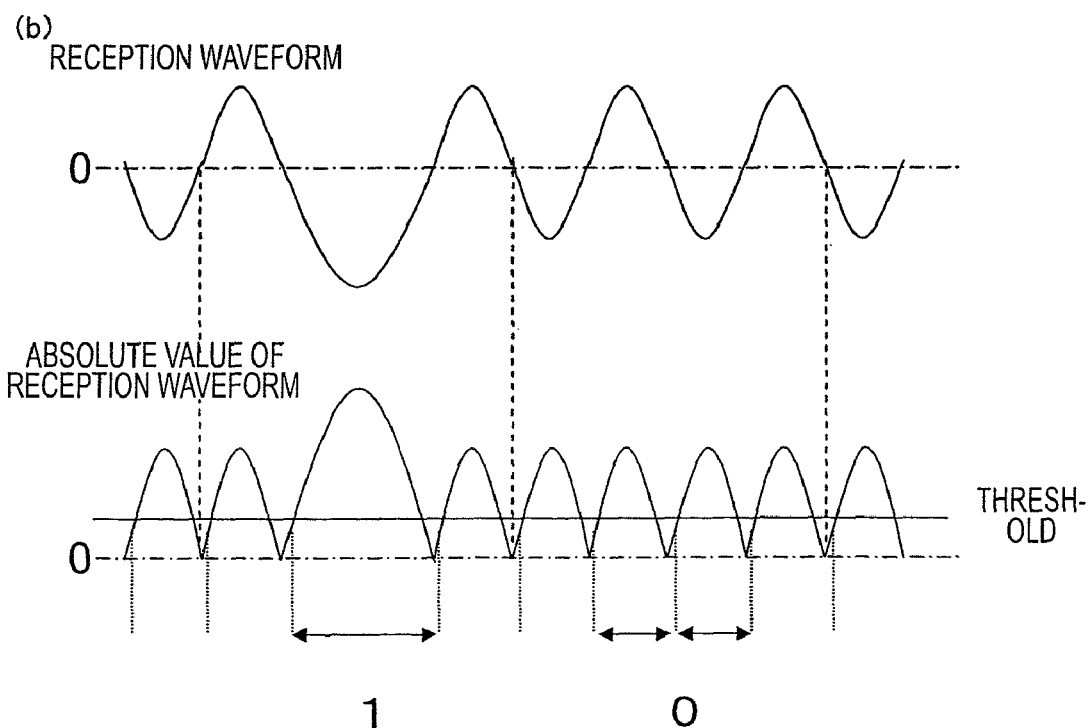

A known demodulation method performs a demodulation using the length of positive or negative data by receiving a signal through an antenna 1601, converting the received signal into an analog electric signal by an RF receiving circuit 1602, converting the analog electric signal into I and Q signals in a base-band conversion manner by a down-converter 1603, and converting and sampling the I and Q signals into digital data by the AD converter 1604 as in FIG. 18(a).

Figure 19:
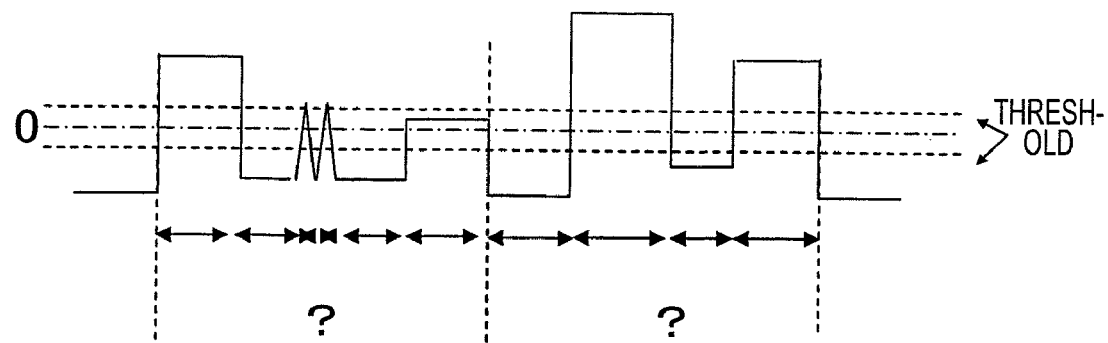
FIG. 19 (a), (b) are received waveform diagrams of a noise or a multi path environment in a conventional demodulation circuit.
Figure 19:
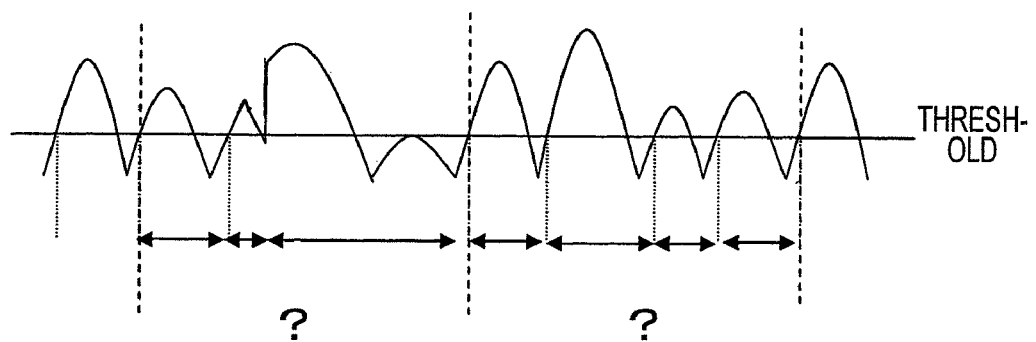

When a differentiation circuit is added to the RF receiving circuit 1602, demodulating data is performed by generating a base-band waveform similar to a sine wave, converting the base-band waveform into digital data by an AD converter 1604, and sampling the digital data, comparing an absolute value to a preset threshold value as in FIG. 18(b), and performing 0 or 1 determination with an interval of points (exceeding points) crossing toward a side larger than the threshold. However, in an environment where a noise or a multi path is so present, the pulse noise may occur in the received signal or the amplitude may not be uniform as in FIG. 19. Accordingly, since the width of the received signal is changed or does not exceed a threshold in some cases, the known demodulation method has a problem in that there is a high possibility of performing an erroneous determination upon demodulating data. However, in is the demodulation method according to the invention, the data is demodulated by make synchronization in a preamble and using data of only peaks of the received waveform. Accordingly, since distortion of the waveform caused due to the noises occurring in portions other than sampling timings and the multi paths does not have an effect on the result of the correlation calculation as in FIG. 20(a), the erroneous determination is not made in the demodulation of data. Moreover, According to the invention, a correlation calculation expression is made so that a difference between cases the data to be demodulated becomes 0 and 1 is the largest. Therefore, the demodulation can be performed appropriately even when a noise has a slight effect on the acquired peak data. For example, when the positive and negative peak values of the received waveform are 1 and −1, respectively, one of combinations of the peak data in the waveform of the data of 0 is I1+Q1=1, I2=Q2=−1, I3=Q3=1, and I4=Q4=−1 and the calculation result is 8. In addition, one of combinations of the peak data in the waveform of the data of 1 is I1=Q1=1, I2=Q2=−1, I3=Q3=−1, and I4=Q4=1 and the calculation result is −8. However, even when it is erroneously determined that I1 and Q1 are 0 in the waveform of the data of 1 due to an influence such as interference caused by the multi paths as in FIG. 20(b), the calculation result becomes −4 and thus becomes a negative value. Accordingly, it is determined that the demodulation data is 1. In addition, even when it is erroneously determined that I2 and Q2 are 0 in the waveform of the data of 0, the calculation result becomes +4 and thus a positive value. Therefore, it is determined rightly that the demodulated data is 0. In this way, the demodulation is possible as long as the noise or the multi paths have an effect on the waveform by a degree of changing a sign of the calculation result obtained in the correlation calculation expression.

Figure 20:
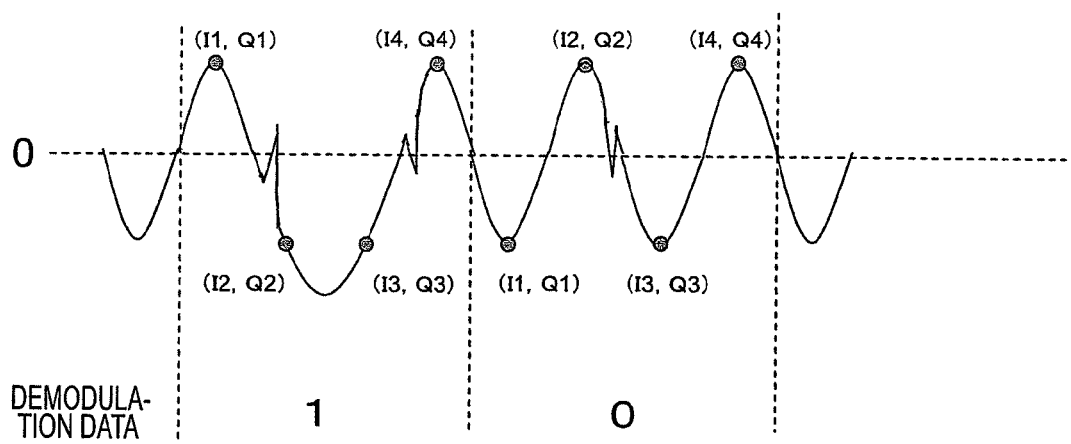
FIG. 20(a), (b) are received waveform diagrams of a noise or a multi path environment in this invention.
Figure 20:
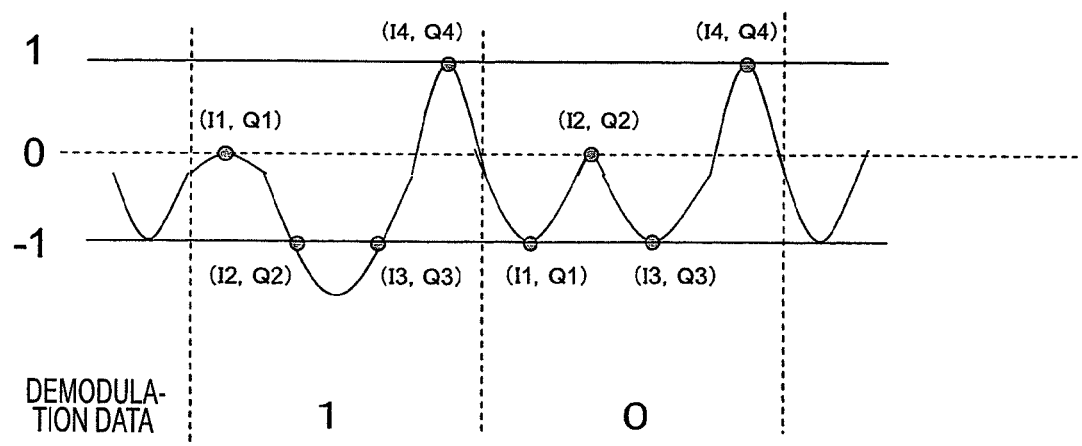

Moreover, even when the width of the received signal is changed, the waveform of the data is changed and thus the I data and the Q data are erroneously detected. Accordingly, the data demodulated in the same manner as that in FIG. 20(b) is rightly determined.

A correlation calculation may be performed with a correlation calculation expression (I1−I4)(I2−I3)+(Q1−Q4)(Q2−Q3). In addition, when a correlation calculation is performed with a correlation calculation expression (I1−I3)(I2−I4)+(Q1−Q3)(Q2−Q4) and the MSB of the calculation result is 0, it is determined that the 1-bit data is 1. When the MSB is 1 it may be determined that the 1-bit data is 0.

In the mirror sub-carrier communication of the setting value M=4 like the setting value M=2, when eight symbol data are input and stored in the temporary storage unit 108, the calculation unit 109 inputs eight symbol data of the I data and eight symbol data of the Q data in a sequence of I1, I2, I3, I4, I5, I6, I7, I8, Q1, Q2, Q3, Q4, Q5, Q6, Q7, and Q8 and performs a correlation calculation with a correlation calculation expression (I1−I2+I3−I4)(I5−I6+I7−I8)+(Q1−Q2+Q3−Q4)(Q5−Q6+Q7−Q8). When the MSB of the calculation result is 1, it is determined that the 1-bit data is 1. Alternatively, when the MSB of the calculation result is 0, it is determined that the 1-bit data is 0.

In the mirror sub-carrier communication of the setting vale M=8, when sixteen symbol data are input and stored in the temporary storage unit 108, the calculation unit 109 inputs sixteen symbol data of the I data and sixteen symbol data of the Q data in a sequence of I1, I2, I3, I4, I5, I6, I7, I8, I9, I10, I11, I12, I13, I14, I15, I16, Q1, Q2, Q3, Q4, Q5, Q6, Q7, Q8, Q9, Q10, Q11, Q12, Q13, Q14, Q15, and Q16 and performs a correlation calculation with a correlation calculation expression (I1−I2+I3−I4+I5−I6+I7−I8)(I9−I10+I11−I12+I13−I14+I15−I16)+(Q1−Q2+Q3−Q4+Q5−Q6+Q7−Q8)(Q9−Q10+Q11−Q12+Q13−Q14+Q15−Q16). When the MSB of the calculation result is 1, it is determined that the 1-bit data is 1. Alternatively, when the MSB of the calculation result is 0, it is determined that the 1-bit data is 0.

Since the number of symbol data used to modulate the 1-bit data increases by a degree of increasing the setting value M, the demodulation possibility increases even in acquisition of erroneous data caused due to the noise or the interference. When a finally received data is demodulated, the receiving operation ends (Step 110). In In and Qn (n=1 to 16) of the correlation calculation expression, n of the I data and the Q data may be substituted by an equal odd number or an equal even number.

Second Embodiment

Figure 4:
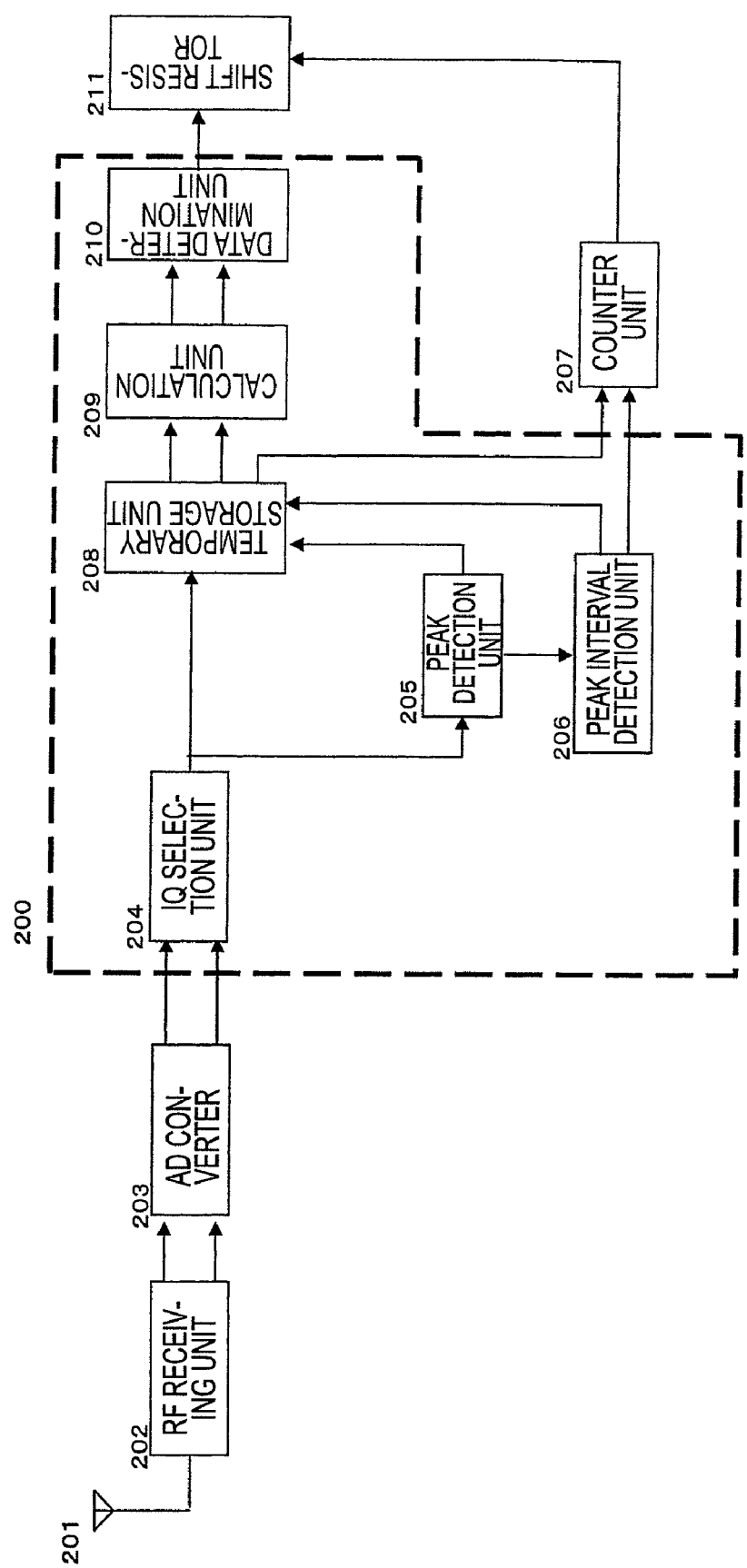
FIG. 4 is a diagram illustrating the configuration of an RFID demodulation circuit according to a second embodiment of the invention.

FIG. 4 is a diagram illustrating the configuration of an RFID demodulation circuit according to a second embodiment of the invention. Likewise with the first embodiment, there is illustrated the RFID demodulation circuit of a receiving device which receives and demodulates data of a mirror sub-carrier from a tag as a communication opponent.

In FIG. 4, Reference Numeral 200 denotes a mirror sub-carrier demodulation circuit. Reference Numeral 201 denotes an antenna which receives UHF RFID wireless signals. Reference Numeral 202 denotes an RF receiving unit which converts the received RF signal into an analog electric signal of I and Q signals and includes a quadrature demodulator, an analog filter, and the like. Reference Numeral 203 denotes an AD converter which converts the analog I and Q signals into a digital signal.

Reference Numeral 204 denotes a IQ signal selection unit which select a signal used to perform demodulation between the digital I and Q signals. Reference Numeral 205 denotes a peak detection unit which detects peak values of the I or Q signal selected by the waveform generation unit 204. Reference Numeral 206 denotes a peak interval detection unit that detects the interval of the peak values of the I or Q signal detected by the peak detection unit 205 and generates timing used to input the received data. Reference Numeral 207 denotes a counter unit that counts the number of the acquired symbol data.

Reference Numeral 208 denotes a temporary storage unit which latches I data and Q data at the timing set by the peak interval detection unit 206 and temporarily stores the latched I data and Q data, Reference Numeral 209 denotes a calculation unit which performs a correlation calculation on the acquired I data and Q data on the basis of a setting value M of the mirror sub-carrier. Reference Numeral 210 denotes a data determination unit which determines data of 0 or 1 from the result of the correlation calculation of the plurality of symbol data performed by the calculation unit 209. Reference Numeral 211 denotes a shift resistor that sequentially stores 1-bit data determined by the data determination unit 210.

Operations of the RFID demodulation circuit having the above-described configuration will be described.

Figure 5:
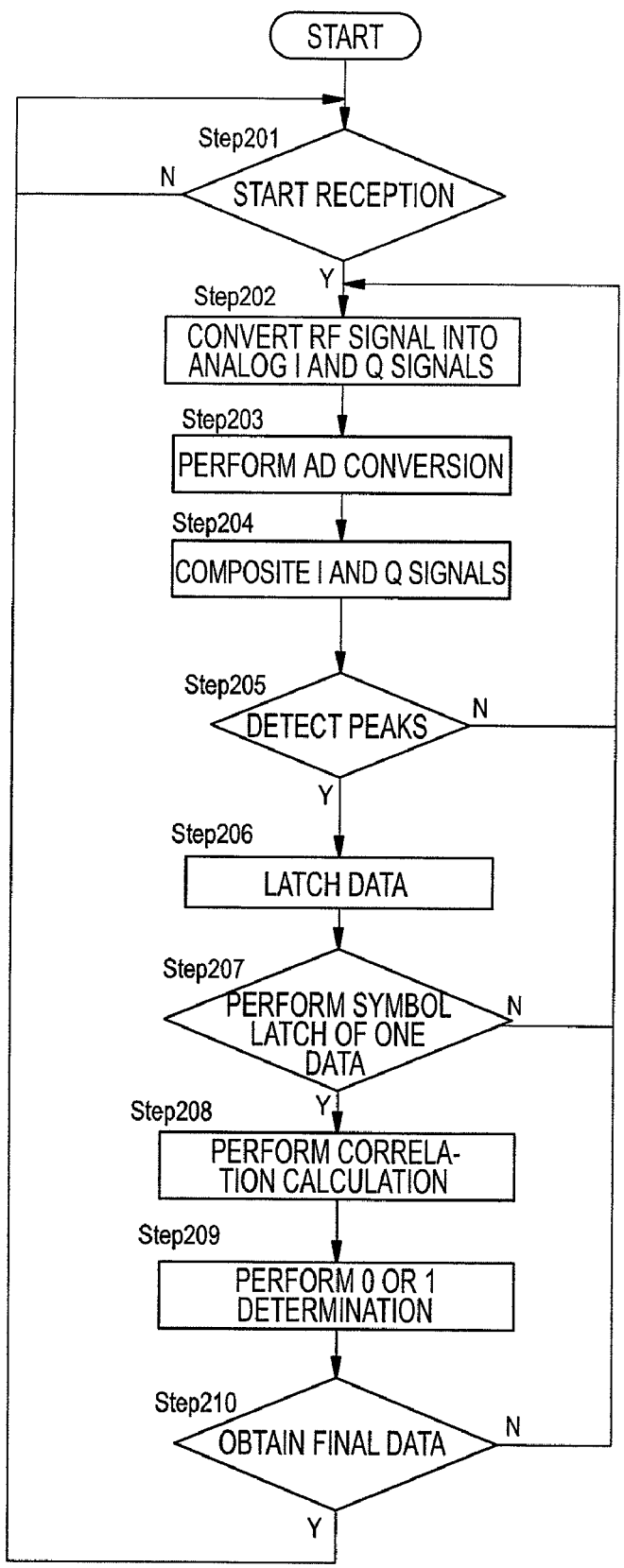
FIG. 5 is a flowchart illustrating operations of the RFID demodulation circuit according to the second embodiment of the invention.

FIG. 5 is a flowchart illustrating the operations of the RFID demodulation circuit according to the second embodiment of the invention.

As illustrated in FIG. 5, the RFID demodulation circuit first transmits a command to a tag. When the reception of the RF signal is enabled (Step 201), the RF signal received by the antenna 201 is converted into the analog electric signal by the RF receiving unit 202 (Step 202), and then the analog electric signal is converted into the digital signal by the AD converter 203 (Step 203).

On the assumption that the I data and Q data which are digitized and sampled at equal timing are In and Qn, respectively, one of the I data and the Q data is selected by the IQ signal selection unit 204 (Step 204). Then, the peak values of the selected I or Q signal are detected by the peak detection unit 205.

The IQ signal selection unit 204 arbitrarily selects one of the I or Q signal and changes the selected signal every arbitrary number of reception times. The selected signal may be changed every arbitrary time. Alternatively, errors may be counted in demodulation and the selected signal may be changed in response to the number of error times. In addition, as a method of determining the signal selected by the IQ signal selection unit 204, a method of comparing the amplitudes of the I and Q signals and selecting the signal having a larger level may be used.

Figure 6:
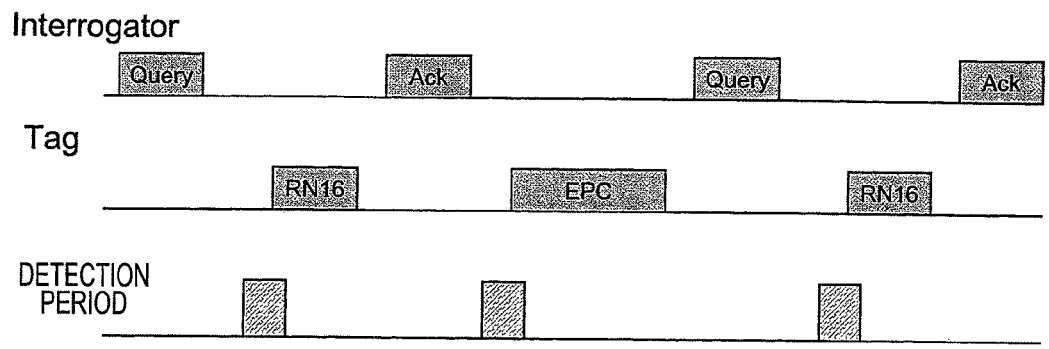
FIG. 6 (1), (2) are diagrams illustrating a detection period of a signal level according to the second embodiment of the invention.
Figure 6:
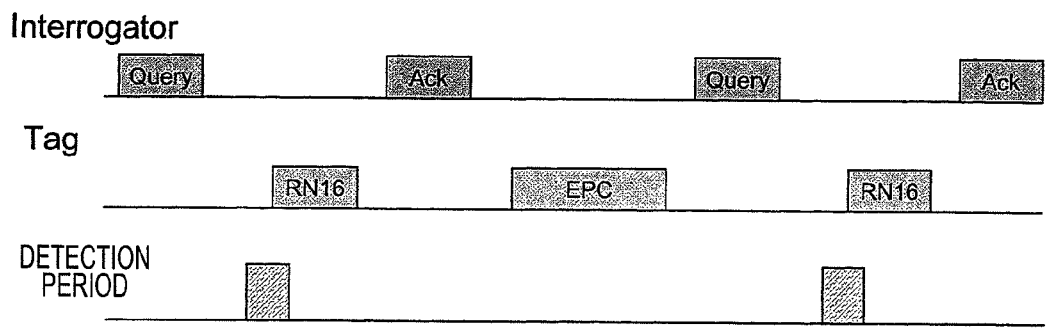

In this case, the amplitude of the I signal is compared to the amplitude of the Q signal to select a signal to be used in demodulation in every frame (see FIG. 6(2)) or every transmission of a query command (see FIG. 6(1)). As another method, a noise level of the I signal is compared to a noise level of the Q signal to select a signal having a smaller noise level. In this case, the detection and comparison of the noise level may be performed every arbitrary number of reception times or every arbitrary time.

As for the detection of the peak values by the peak detection unit 205, at least two sampling data are temporarily stored at normal time, and time at which variation in values of the two continuous sampling data is turned from increase to decrease is set to a peak value.

Alternatively, three or more sampling data may temporarily be stored and time at which values of sampling data of three or more continuous arbitrary numbers continuously increase and then values of sampling data of three or more continuous numbers continuously decrease may be set to a peak value. In this way, it is possible to reduce erroneous detection of the peaks caused due to a pulse noise or the like.

When the peak detection unit 205 detects the peak values, an interval between one peak value and the next peak value is counted as a normal sampling frequency. In addition, when peak intervals between continuous arbitrary numbers are detected to be within an arbitrary difference, an average value of the intervals is set to a timing interval for inputting data.

For example, it is assumed that intervals (sampling count number between a peak and the next peak) between four continuous peaks are T1, T2, and T3, respectively, and a tolerance value of a difference between the respective values is two sampling counts as in FIG. 3(b). When differences T1−T2, T2−T3, and T1−T3 between the intervals satisfies inequalities of $|T1-T2|\leq 2$, $|T2-T3|\leq 2$, and $|T1-T3|\leq 2$, the peak interval T is set to an average $T=(T1+T2+T3)/3$.

When the peak interval T is set, the peaks are detected between the previous and next arbitrary counts with reference to the peak interval T in consideration of the tolerance difference of the waveform. For example, when the arbitrary count number is three counts, the peaks between T−3 and T+3 (an actual value is three since the counter is set at T) of the counters of the peak interval detection unit are detected by the peak detection method described above. When no peak is detected until the count T, the I data or the Q data selected by the IQ signal selection unit 204 are temporarily input and stored at the count T. When no peak is detected until the count T+3, the value is set to one symbol data.

Alternatively, when the peak is detected until the count T+3 (Step 205), the I data or the Q data selected at the detection timing are stored as one symbol data in the temporary storage unit 208 (Step 206). The counter of the peak interval detection unit 206 is reset when the count is T or the peak is detected.

The counter unit 207 counts the number of a data input process. In the mirror sub-carrier communication of the setting value M=2, when four symbol data are stored in the temporary storage unit 208 (Step 207), the calculation unit 209 uses four symbol data of the I data or the Q data. When the IQ signal selection unit 204 selects the I signal, a correlation calculation expression (I1−I2)(I3−I4) is calculated in a sequence of storing the four symbol data on the assumption that the four symbol data of the I data are I1, I2, I3, and I4

(Step 208). When a MSB of the calculation result is 1, it is determined that the 1-bit data is 1. When the MSB of the calculation result is 0, it is determined that the 1-bit data is 0 (Step 209). Alternatively, upon selecting the Q signal, the correlation calculation express is (Q1−Q2)(Q3−Q4).

In the mirror sub-carrier communication of the setting value M=4, when eight symbol data are stored in the temporary storage unit 208, the calculation unit 209 uses eight symbol data of the I data or the Q data. When the IQ signal selection unit 204 selects the I signal, a sequence of storing the eight symbol data is I1, I2, I3, I4, I5, I6, I7, and I8, and a correlation calculation expression (I1−I2+I3−I4)(I5−I6+I7−I8) is calculated. When the MSB of the calculation result is 1, it is determined that the 1-bit data is 1. Alternatively, when the MSB of the calculation result is 0, it is determined that the 1-bit data is 0. Alternatively, upon selecting the Q signal, the correlation calculation expression is (Q1−Q2+Q3−Q4)(Q5−Q6+Q7−Q8).

In the mirror sub-carrier communication of the setting vale M=8, when sixteen symbol data are stored in the temporary storage unit 208, the calculation unit 209 uses sixteen symbol data of the I data and sixteen symbol data of the Q data. When the IQ signal selection unit 204 selects the I signal, a sequence of storing the sixteen symbol data is I1, I2, I3, I4, I5, I6, I7, I8, I9, I10, I11, I12, I13, I14, I15, and I16 and a correlation calculation expression (I1−I2+I3−I4+I5−I6+I7−I8)(I9−I10+I11−I12+I13−I14+I15−I16) is calculated. When the MSB of the calculation result is 1, it is determined that the 1-bit data is 1. Alternatively, when the MSB of the calculation result is 0, it is determined that the 1-bit data is 0. Alternatively, upon selecting the Q signal, the correlation calculation expression is (Q1−Q2+Q3−Q4+Q5−Q6+Q7−Q8)(Q9−Q10+Q11−Q12+Q13−Q14+Q15−Q16).

When a finally received data is demodulated, the receiving operation ends (Step 210).

According to the above-described embodiments, as described above, the mirror sub-carrier demodulation circuit receives and demodulates data of the mirror sub-carrier. The mirror sub-carrier demodulation circuit includes: the waveform generation unit which generates the composite waveform of received the I and Q signals; the peak detection unit which detects the peak values of the composite waveform generated by the waveform generation unit; the peak interval detection unit which detects the interval of the peak values detected by the peak detection unit and generates the timing used to input the received data; the storage unit which stores I data and Q data at the timing generated by the peak interval detection unit; the correlation calculation unit which performs the correlation calculation using the I data and the Q data of the storage unit obtained on the basis of the setting value M of the mirror sub-carrier during the 1-bit period; and the data determination unit which determines data of 0 or 1 from the calculation result of the correlation calculation unit. Accordingly, when only the data at the acquired peaks can be obtained, the demodulation can be performed. Therefore, since it is possible to reduce the influence of the noise occurring at timing other than the timing at which the symbol data is acquired, the mirror sub-carrier demodulation circuit capable of more surely demodulating the received date from the tag even in the environment of the noise or the interference of other devices can be realized.

In the case of the setting value M=2, the correlation calculation unit performs the correlation calculation with the correlation calculation expression (I1−I2)(I3−I4)+(Q1−Q2)(Q3−Q4).

In the case of the setting value M=4, the correlation calculation unit performs the correlation calculation with the correlation calculation expression (I1−I2+I3−I4)(I5−I6+I7−I8)+(Q1−Q2+Q3−Q4)(Q5−Q6+Q7−Q8).

In the case of the setting value M=8, the correlation calculation unit is performs the correlation calculation with the correlation calculation expression (I1−I2+I3−I4+I5−I6+I7−I8)(I9−I10+I11−I12+I13−I14+I15−I16)+(Q1−Q2+Q3−Q4+Q5−Q6+Q7−Q8)(Q9−Q10+Q11−Q12+Q13−Q14+Q15−Q16).

The data determination unit determines a most significant bit of the correlation calculation unit as demodulation data having the 1-bit period.

When the peak detection unit detects peaks of the composite waveform in the burst signal of the first half of the preamble, measures the intervals of the plurality of continuous peaks by the counter of the arbitrary period, and sets the average time (count number) of the intervals as a symbol acquisition period, the peak detection unit detects the next peak within an arbitrary time between the previous and next arbitrary times with reference to time set from the detected peaks. With such a configuration, it is possible to obtain an advantage of correcting the peak interval by moving the reception waveform and an advantage of reducing erroneous detection of the peaks in the composition waveform of the I and Q signals which is caused due to the noise and the interference.

The peak detection unit sets as the peak of the waveform the time point at which variation in two continuous sampling data is turned from increase to decrease. With such a simple circuit configuration, it is possible to detect the peaks of the composite waveform of the I and Q signals.

The peak detection unit sets as the peak of the waveform the time point at which three or more continuous sampling data increase in succession and then three or more continuous sampling data decrease in succession. With such a configuration, it is possible to detect the peaks of the composite waveform so as not to erroneously the pulse noise having a narrow width.

In communication where the pilot tone is added to a response from a communication opponent, when the peak detection unit detects the peaks of the composite waveform with the pilot tone, measures intervals of the plurality of continuous peaks by the counter of an arbitrary period, and sets an average time (count number) of the intervals as a symbol acquisition period, the peak detection unit detects the next peak within an arbitrary time between the previous and next arbitrary times with reference to time set from the detected peaks. With such a configuration, it is possible to obtain an advantage of correcting the peak interval by moving the reception waveform and an advantage of reducing erroneous detection of the peaks in the composition waveform of the I and Q signals which is caused due to the noise and the interference.

Since the peak detection unit detects only peaks of the I and Q signals having levels larger than an arbitrary threshold value, the noise having a level lower than the threshold value is not erroneously detected.

On the basis of a noise level detected before receiving a signal from the communication opponent, the peak detection unit sets a level larger than the noise level as the threshold value.

The composite waveform generated by the waveform generation unit is one of $I_n^2+Q_n^2$, $|I_n|+|Q_n|$, and $|I_n+I_{n+1}|+|Q_n+Q_{n+1}|$. When the composite waveform is $I_n^2+Q_n^2$, the composite waveform having no variation in its amplitude caused due to movement of a tag can be obtained, thereby detecting a signal more precisely. Moreover, the 1-bit data can be demodulated using the plurality of symbol data acquired at the timing at which the composite waveform is at the peak. Accordingly, even when data distorted due to the noise or the interference is present, the data can be interpolated with another symbol data. When the composite waveform is |In|+|Qn|, the composite waveform can be generated with a simpler circuit configuration. When the composite waveform is |In+In+1|+|Qn+Qn+1|, it is possible to obtain the composite waveform in which a noise added to a signal is reduced.

The mirror sub-carrier demodulation circuit receives and demodulates data of a mirror sub-carrier, and includes: the selection unit which selects one of the received I and Q signals; the peak detection unit which detects the peak values of the signal waveform of the I data or the Q data selected by the selection unit; the peak interval detection unit which detects the interval of the peak values detected by the peak detection unit and generates timing at which the received data is input; the storage unit which stores the I data or the Q data at the timing generated by the peak interval detection unit; the correlation calculation unit which performs the correlation calculation using the I data and the Q data of the storage unit obtained during the 1-bit period; and the data determination unit which determines the data of 0 or 1 from the result calculated by the correlation calculation unit. The mirror sub-carrier demodulation circuit does not receive an influence of phase change of the I data and the Q data, since a simpler circuit (having smaller gates) can be configured.

In the case of the setting value M=2, the correlation calculation unit performs the correlation calculation with the expression (I1−I2)(I3−I4) or the expression (Q1−Q2)(Q3−Q4).

In the case of the setting value M=4, the correlation calculation unit is performs the correlation calculation with the expression (I1−I2+I3−I4)(I5−I6+I7−I8) or the expression (Q1−Q2+Q3−Q4)(Q5−Q6+Q7−Q8).

In the case of the setting value M=8, the correlation calculation unit performs the correlation calculation with the expression (I1−I2+I3−I4+I5−I6+I7−I8)(I9−I10+I11−I12+I13−I14+I15−I16) or the expression (Q1−Q2+Q3−Q4+Q5−Q6+Q7−Q8)(Q9−Q10+Q11−Q12+Q13−Q14+Q15−Q16).

The data determination unit sets the most significant bit of the correlation calculation unit as demodulation data having the 1-bit period It is possible to more surely demodulation the received data from more tags, compared to the case of demodulating only the I signal or the Q signal, since the selection unit changes the selection of the I signal and the Q signal every arbitrary time.

Moreover, it is possible to more surely demodulation the received data from more tags, compared to the case of demodulating only the I signal or the Q signal, since the selection unit changes the selection of the I signal and the Q signal every time in response to arbitrary number of error times.

Moreover, it is possible to demodulate more tag data by performing the demodulation using a signal having a large amplitude level, since the selection unit changes the selection of the I signal and the Q signal on the basis of the amplitude level in the burst portion or the pilot tone portion of the preamble.

Moreover, it is possible to demodulate more tag data by detecting the amplitude level of the I signal and the Q signal every frame and performing the demodulation with the signal having the large amplitude level, since the amplitude level of the I signal and the Q signal every frame.

Moreover, it is possible to modulate more tag data, since the amplitude level of the I signal and Q signal whenever the query command is transmitted.

The selection unit selects the signal having the lower noise level on the basis of the noise level of the I signal and the Q signal detected before the signal is received from the communication opponent. Accordingly, it is possible to reduce the erroneous detection caused due to the noise and demodulate more tag data by performing the demodulation with the signal having the lower noise level.

The noise levels of the I signal and the Q signal are detected every arbitrary number of transmitted query commands.

Alternatively, the noise levels of the I signal and the Q signal are detected every arbitrary time.

Hereinafter, a method of correcting a difference of synchronization to sample the peak values more precisely will be described.

Third Embodiment

In this embodiment, an example applied to an RFID reader/writer will be described below.

In an RFID system, goods or the like are managed by allowing the reader/writer to read information stored in a tag. In order to manufacture the tag included in a simpler circuit at low cost, clock precision of the tag is permissible largely in standard. Comparing other wireless communication, the clock precision is restricted within ±25 ppm in a wireless LAN of the IEEE802.1b standard, for example. However, a clock difference is permissible up to maximum ±22% in EPC global Class 1 Generation 2 that is the RFID standard, and thus such a difference is almost 1000 times. Accordingly, a synchronization capturing and tracking capability of a receiving circuit of the RFID reader/writer has to be a far more excellent than that of another wireless communication.

Figure 7:
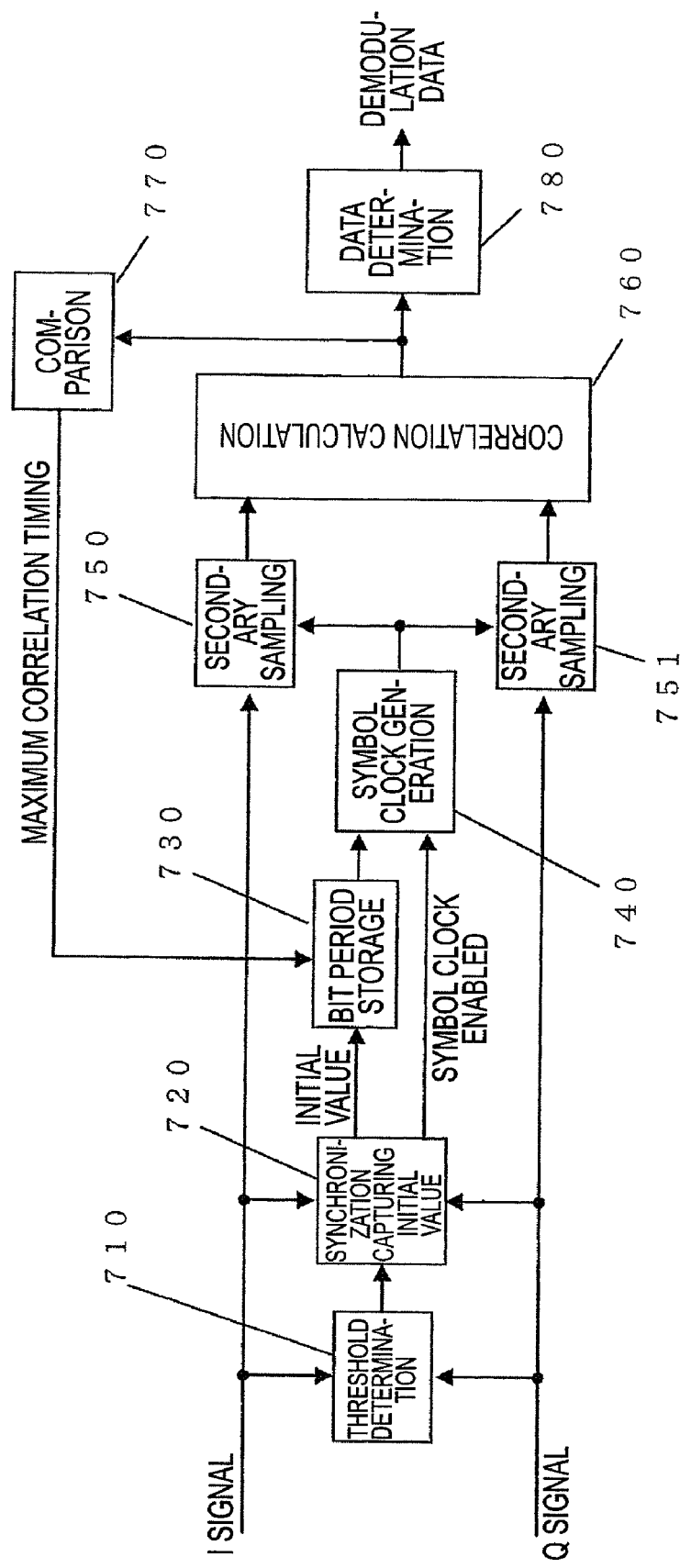
FIG. 7 is a diagram illustrating the configuration of a demodulation circuit including a synchronization tracking circuit according to a third embodiment of the invention.

FIG. 7 is a diagram illustrating the configuration of a demodulation circuit including a synchronization tracking circuit according to a third embodiment of the invention.

In FIG. 7, Reference Numeral 710 denotes a threshold determination circuit that determines a threshold used to detect a desired signal. Reference Numeral 720 denotes a synchronization capturing circuit which inputs received I and Q signals and the threshold, captures initial synchronization for the received signals, and outputs an inferred bit period and symbol timing. Reference Numeral 730 denotes a bit period storage circuit that stores the inferred bit period and increases or decreases a value of the stored bit period when a control signal is input. Reference Numeral 740 denotes a symbol clock reproduction circuit which outputs a symbol clock on the basis of a symbol timing output from the synchronization capturing circuit 720 and the inferred bit period stored in the bit period storage circuit 730.

Reference Numerals 750 and 751 denote secondary sampling circuits which sample the I and Q signals using the reproduction symbol clock output by the symbol clock generation circuit 740. Reference Numeral 760 denotes a correlation calculation circuit that performs a correlation calculation on the data sampled by the secondary sampling circuits 750 and 751. Reference Numeral 770 denotes a comparison circuit that compares largeness and smallness of correlation values output from the correlation calculation circuit 760. Reference Numeral 780 denotes a data determination circuit which determines data on the basis of the correlation values output from the is correlation calculation circuit 760 and outputs demodulation data.

Operations of the demodulation circuit with the above-described configuration illustrated in FIG. 7 will be described.

First, when the reader/writer is switched to a reception mode, the threshold determination circuit 710 determines the threshold and the synchronization capturing circuit 720 captures an initial operation. When signs determined upon transmitting signals from a tag to the reader/writer are set by signs of the mirror sub-carrier, head portions of the I and Q signals received in the reader/writer have a waveform in which positives and negatives are periodically repeated. Accordingly, by detecting the periodic repetition, the initial synchronization is captured. An example of the synchronization circuit is illustrated in FIG. 8.

Figure 8:
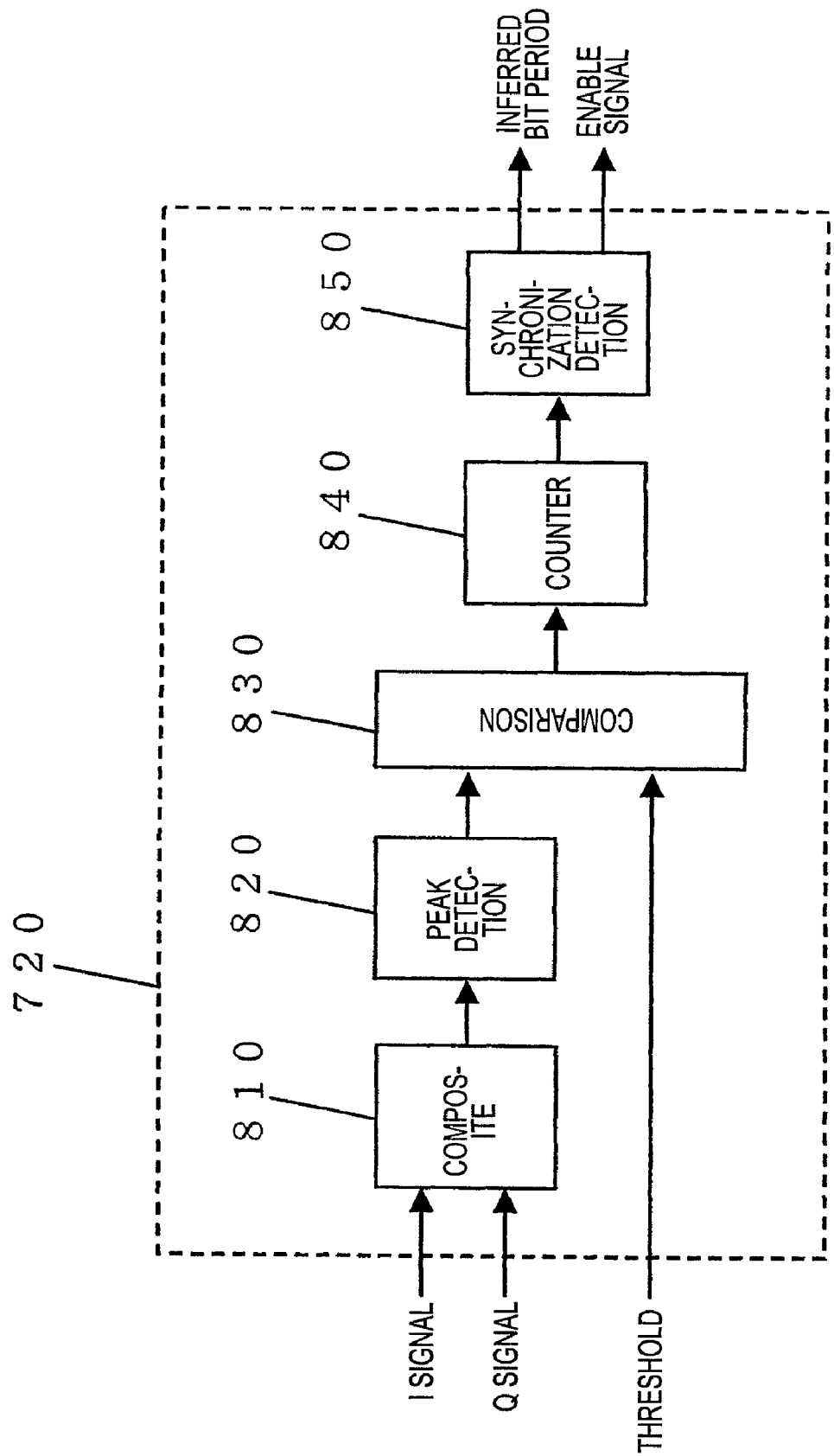
FIG. 8 is a diagram illustrating the configuration of a synchronization capturing circuit according to the third embodiment of the invention.

FIG. 8 is a diagram illustrating the synchronization circuit according to the third embodiment of the invention.

In FIG. 8, Reference Numeral 810 denotes a composite circuit which composites the received I and Q signals. Examples of a composition expression include $|I(n)|+|Q(n)|$, $I(n)^2+Q(n)^2$, $|I(n)+((n+1)|+|Q(n)+Q(n+1)|$, and $(I(n)+I(n+1))^2+(Q(n)+Q(n+1))^2$ (where n is a natural number representing a number of a sample subjected to over-sampling).

Alternatively, a calculation expression for measuring the amplitudes of phases of the I and Q signals even in variation in the phases thereof may be used. The composite expression used for the composite circuit 810 is not limited to the suggested calculation expressions.

The peak detection circuit 820 detects the peak values of a signal output from the composite circuit 810. The comparison circuit 830 determines is whether the peak value detected by the peak detection circuit 820 is larger than the threshold input from the threshold determination circuit 710. When the peak value is larger than the threshold, the peak value is notified to a counter 840.

In this case, the threshold needs to have a value for detecting the signal transmitted from a tag. The threshold determination circuit 710 may be realized by configuring a circuit capable of detecting a noise level during a no signal period immediately before a response from the tag is returned, and setting a value larger than the maximum of the noise level as the threshold. Alternatively, the threshold determination circuit 710 may be realized by configuring a circuit capable of detecting the level of a signal received from each tag and setting the threshold corresponding to the level every detection time. Alternatively, the threshold determination circuit 710 may be realized by configuring a circuit capable of monitoring a signal level of a burst portion in a preamble of a signal received from each tag during an arbitrary period and setting a value smaller than the maximum value of the arbitrary period as the threshold value. Alternatively, the threshold determination circuit 710 may be realized by configuring a circuit capable of adding a pilot tone to a response of each tag, monitoring a signal level of the pilot tone during an arbitrary period, and setting a value (for example, ½ of the maximum value) smaller than the maximum value of the arbitrary period as the threshold value. Alternatively, the threshold determination circuit 710 may be realized by configuring a circuit capable of detecting values of arbitrary peaks of the burst portion of the preamble in the signal received from each tag and setting a value smaller than an average value of the plurality of peaks. Alternatively, the threshold determination circuit 710 may be realized by configuring a circuit capable of adding a pilot tone to a response of each tag, detecting values of arbitrary peaks of the pilot tine, and setting a value (for example, ½ of an average value of the peak values) smaller than the average value of the plurality of peak values as the threshold. When the reader/writer performs control such as switch of a plurality of antennas, by re-detecting the noise level the threshold is reset at least whenever the antenna is switched. In this way, variation in the noise caused due to the switch of the antennas can be handled. In addition, when the response from each tag is not received during a certain period, the noise level is repeatedly detected and the threshold is reset in order to prevent communication failure that may be caused by erroneous setting of the threshold.

The counter 840 counts the peak intervals of the composite waveform of the I and Q signals. A synchronization detection circuit 850 determines that a desired signal arrives and detects synchronization, when two or more peak intervals output from the counter 840 are continuously present within a certain range. For example, when it is assumed that the peak interval is a 15-clock length at a certain time point and when two or more peak intervals continuously arrive in a range of 15±1 clocks immediately after the certain time point, the synchronization detection circuit 850 determines that the desired signal arrives and establishes initial synchronization by inferring and outputting a bit period from the peak interval.

At this time, an enable signal for informing timing of a symbol clock is also output. The length of the inferred bit period is different depending on the setting value M of the mirror sub-carrier.

Figure 9:
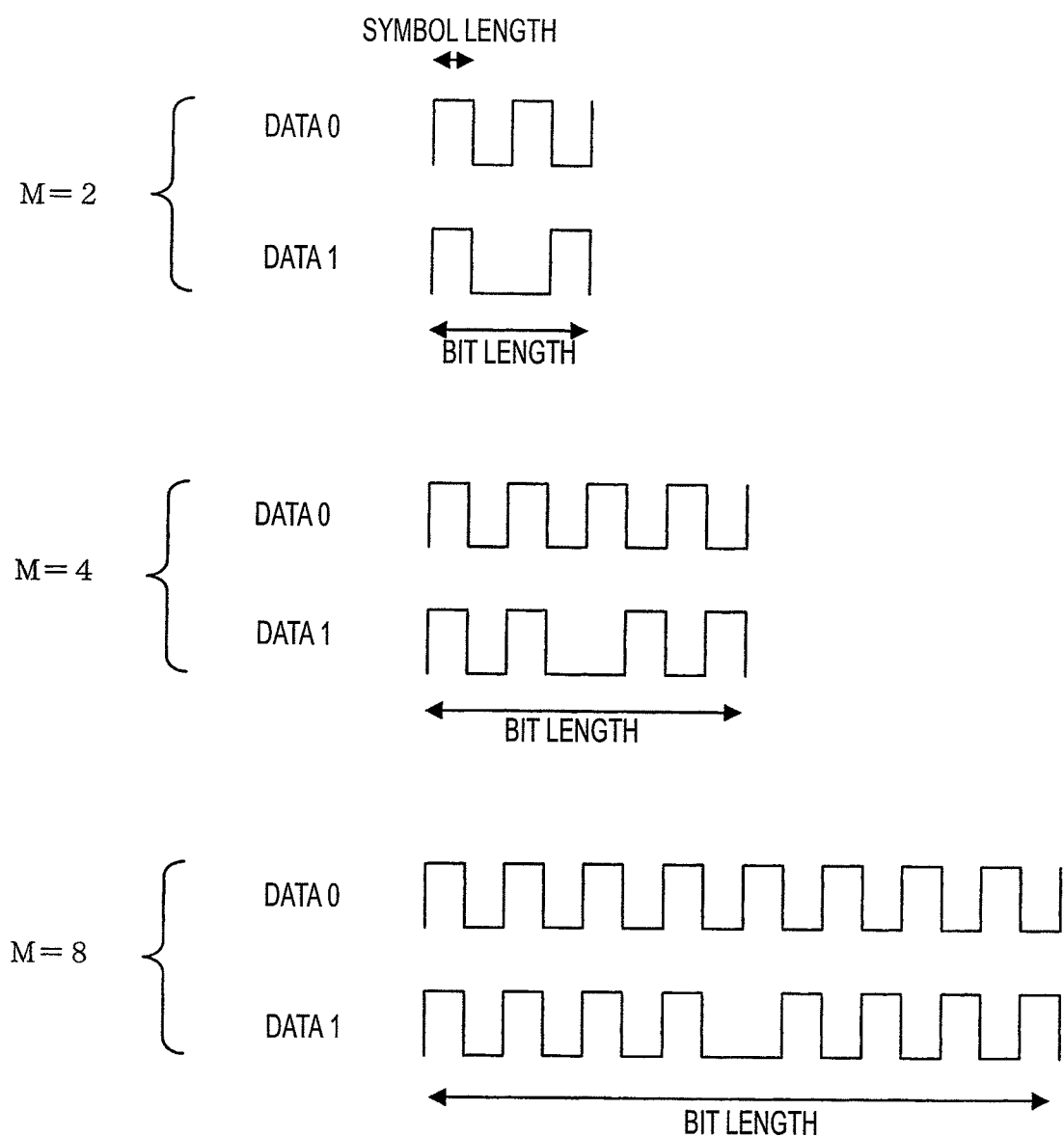
FIG. 9 is an explanatory diagram illustrating the sign of the mirror sub-carrier according to the third embodiment of the invention.

The setting M is specified in the EPC global Class 1 Generation 2 standard and is a value set by the reader/writer. FIG. 9 shows a correspondence between the setting value M and the sign of the mirror sub-carrier.

FIG. 9 is an explanatory diagram illustrating the sign of the mirror sub-carrier according to the third embodiment of the invention.

As illustrated in FIG. 9, the peak interval corresponds to a symbol length. Accordingly, a bit period is four times as large as the symbol length in a case of the setting value M=2, eight times as large as the symbol length in a case of the setting value M=4, and sixteen times as large as the symbol length in a case of the setting value M=8. The synchronization circuit 850 infers the bit period from the plurality of peak intervals in accordance with the values of the setting value M.

When the initial synchronization is established, a synchronization tracking operation starts so as to cause deviation of the synchronization. Hereinafter, the synchronization tracking operation will be described in detail.

A symbol clock reproduction circuit 740 receives an enable signal from the synchronization capturing circuit 720 and then outputs the symbol clock at the calculated interval using the inferred bit period stored in the bit period storage circuit 730. The intervals for outputting the symbol clock are obtained by dividing the inferred bit period by 4, 8, and 16 for the setting values M=2, 4, and 8, respectively. At this time, when the divided result is not divided, all remaining clocks are distributed if possible.

The secondary sampling circuits 750 and 751 sample the I and Q signals at the symbol clock and timings before and after the symbol clock on the basis of the reproduced symbol clock. The correlation calculation circuit 760 performs a correlation calculation at three timings, that is, the symbol clock and the timings before and after the symbol clock. The calculation expression needs to represent a larger correlation value as the synchronization is more precise. At the same time, it is preferable to contribute to data determination. The calculation expression can be realized as the following expressions obtained by preparing a resultant vector of the first half of bits and a resultant vector of the second half of the bits with data subjected to a secondary sampling operation, determining the data with positives and negatives of an inner product of the resultant vectors, and appraising a synchronization certainty with the absolute value in consideration of the fact that the signs of the mirror sub-carrier are reversed by 780° in phases with reference to the first half and the second half of the bits as in FIG. 9.

In the case of the setting value M=2, the expression (I1−I2)(I3−I4)+(Q1−Q2)(Q3−Q4) is satisfied. In the case of the setting value M=4, the expression (I1−I2+I3−I4)(I5−I6+I7−I8)+(Q1−Q2+Q3−Q4)(Q5−Q6+Q7−Q8) is satisfied. In the case of the setting value M=8, the expression (I1−I2+I3−I4+I5−I6+I7−I8)(I9−I10+I11−I12+I13−I14+I15−I16)+(Q1−Q2+Q3−Q4+Q5−Q6+Q7−Q8)(Q9−Q10+Q11−Q12+Q13−Q14+Q15−Q16) is satisfied.

The I1 to I16 and the Q1 to Q16 are the I data and Q data subjected to the secondary sampling operation. The results of the secondary sampling operation are illustrated in FIGS. 10 to 12.

Figure 10:
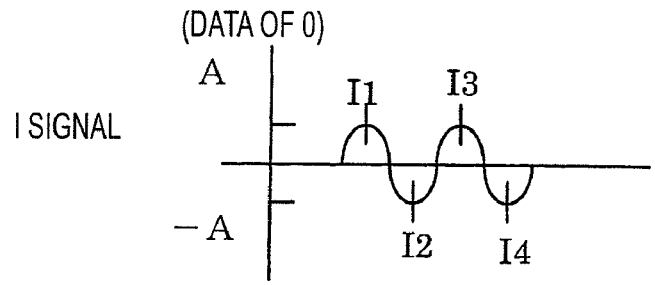
FIG. 10 is a diagram for explaining secondary sampling operation according to the third embodiment of the invention.
Figure 10:
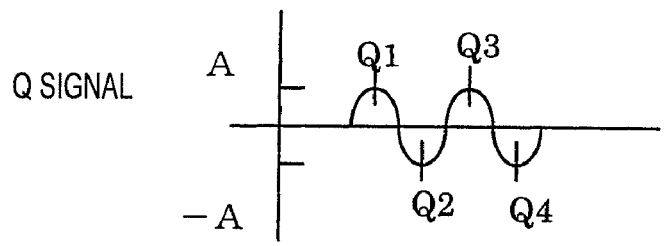
Figure 10:
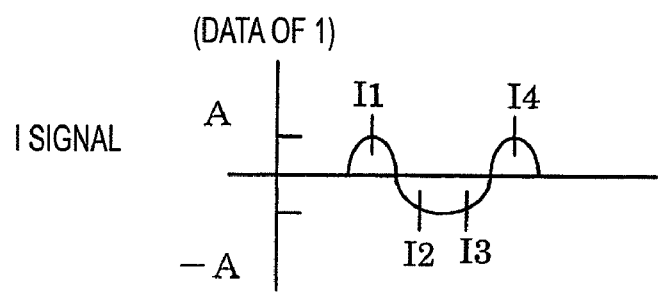
Figure 10:
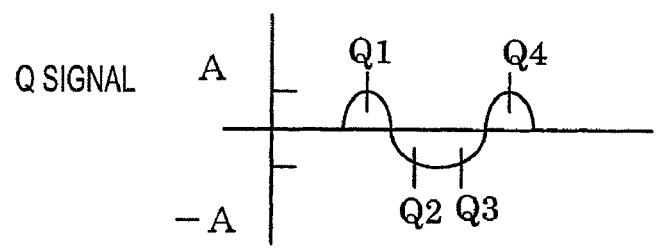
Figure 11:
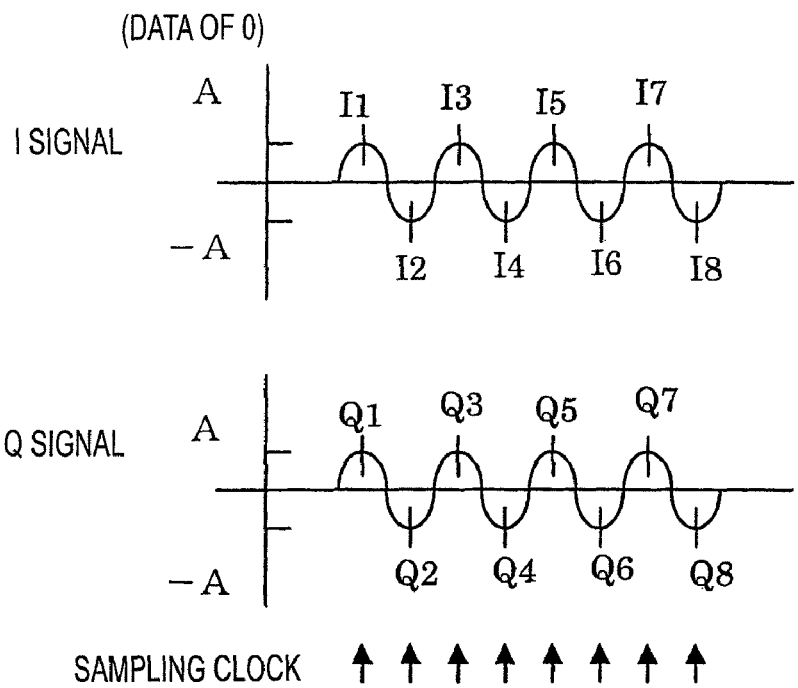
FIG. 11 is a diagram for explaining the secondary sampling operation according to the third embodiment of the invention.
Figure 11:
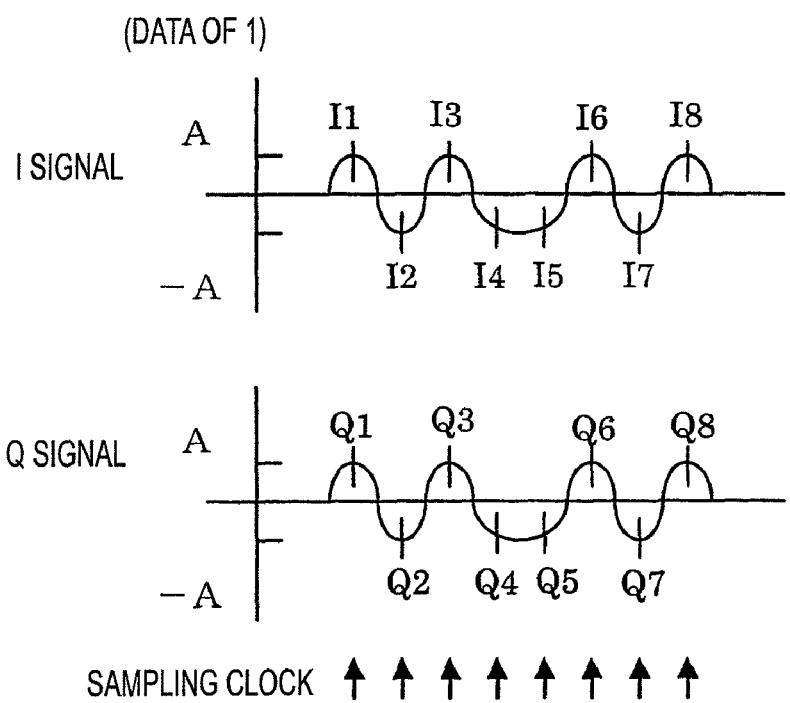
Figure 12:
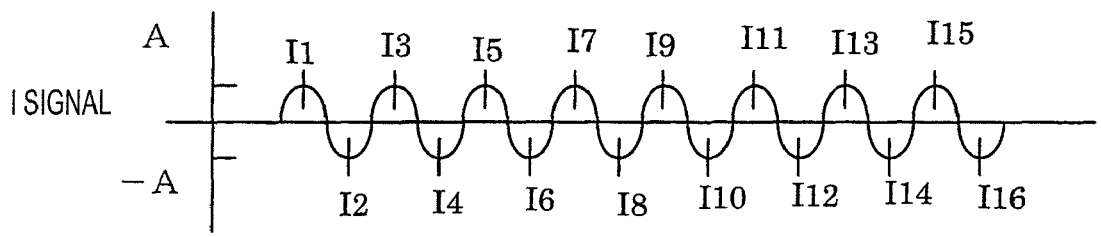
FIG. 12 is a diagram for explaining the secondary sampling operation according to the third embodiment of the invention.
Figure 12:
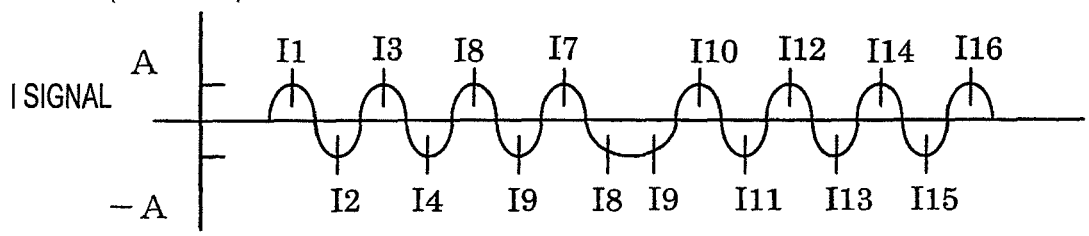

FIGS. 10 to 12 are diagrams for explaining the secondary sampling operation according to the third embodiment of the invention. FIG. 10 shows the case of the setting value M=2. FIG. 11 shows the case of the setting value M=4. FIG. 12 shows the case of the setting value M=8.

Referring to FIG. 10, the case of the setting value M=2 will be described. The resultant vector of the first half of the bits is (I1−I2, Q1−Q2) and the resultant vector of the second half of the bits is (I3−I4, Q3−Q4). In a case of the data of 0, a value of the resultant vector in the first half of the bits is (2 A, 2 A) and a value of the resultant vector in the second half of the bits is (2 A, 2 A). In a case of the data of 1, a value of the resultant vector in the first half of the bits is (2 A, 2 A) and a value of the resultant vector in the second half of the bits is (−2 A, −2 A). As for a difference between the data of 0 and the data of 1 in the resultant vectors, the phase difference between the resultant vectors of the first half and the second half is 0° in the case of the data of 0. However, in the case of the data of 1, the phase difference between the resultant vectors of the first half and the second half is 780°. Actually, the phase difference represents various values due to the synchronization difference, the influence of the noise, or the like. However, when the phase difference is smaller than 90°, the data of 0 is set. In addition, when the phase difference is larger than 90°, the data of 1 is set. Whether the phase difference between the two vectors is larger or smaller than 90° depends on a positive or a negative of the inner product of the two vectors.

That is, the data determination circuit 780 determines the data of 0 when the result of the above-described correlation calculation is a positive, and determines the data of 1 when the result is a negative. In the above-described example, the inner product in the case of the data of 0 is 8 $A^2$ and the inner product in the case of the data of 1 is −8 $A^2$. Accordingly, it can be known that the data determination is possible in the above-described calculation expressions. Likewise, the data determination can also be performed in the cases of the setting value M=4 and the setting value M=8.

Next, referring to FIG. 13, the synchronization tracking operation will be described in the case of the setting value M=2.

Figure 13:
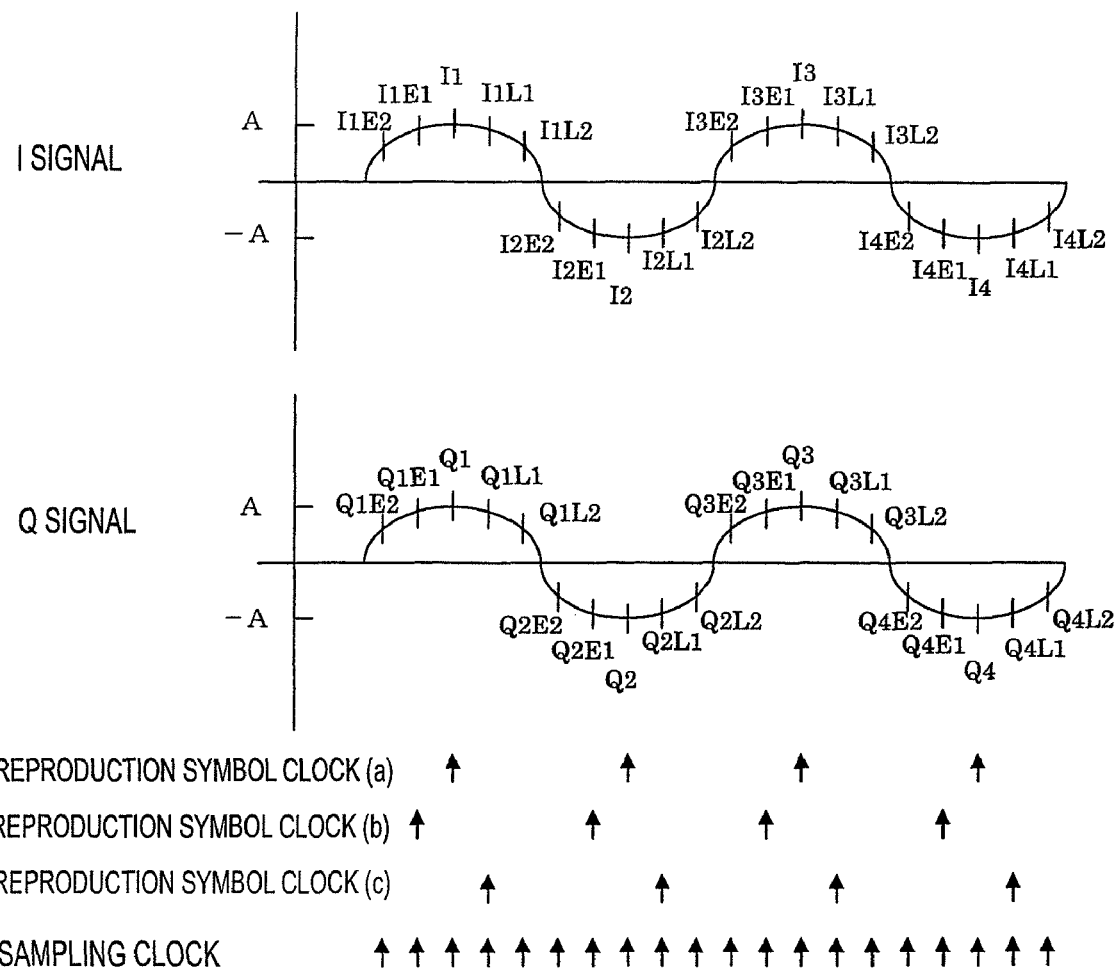
FIG. 13 is a diagram for explaining the secondary sampling operation according to the third embodiment of the invention.

FIG. 13 is a diagram for explaining the secondary sampling operation according to the third embodiment of the invention and showing an over-sampling operation that is performed a rate five times as large as a symbol rate. In addition, the over-sampling may be performed several times in a case of two or more natural number.

In order to perform the synchronization tracking operation, the correlation calculation is performed using the I data and Q data subjected to the secondary sampling operation at the symbol clock and the clocks before and the after the symbol clock.

In FIG. 13, when it is assumed that the symbol clock is reproduced at timing of a reproduction symbol clock (a), the I data and the Q data sampled at the reproduction symbol clock are (I1, Q1), (I2, Q2), (I3, Q3), (I4, Q4), etc. In addition, the I data and the Q data at timing earlier than the reproduction symbol clock by one sampling timing are (I1E1, Q1E1), (I2E1, Q2E1), (I3E1, Q3E1), (I4E1, Q4E1), etc. In addition, the I data and the Q data at timing later than the reproduction symbol clock by one sampling timing are (I1L1, Q1L1), (I2L1, Q2L1), (I3L1, Q3L1), (I4L1, Q4L1), etc.

The correlation calculation circuit 760 performs the correlation calculation at three timings and the comparison circuit 770 compares the largeness and smallness of the absolute values of the correlation values at the respective timings. When the reproduction symbol clock is the reproduction symbol clock (a) in FIG. 13, the absolute values of the I data and the Q data at the previous and next timings are smaller than values obtained by the sampling at the reproduction symbol clock. Accordingly, as for the comparison result of the comparison circuit 770, it is determined that the correlation value at the timing of the reproduction symbol clock is the largest. At this time, it is determined that the timing of the reproduction symbol clock is appropriate, and thus the timing of the reproduction symbol clock is also used in the next bit sampling.

However, when the reproduction symbol clock is deviated like a reproduction symbol clock (b) in FIG. 13, for example, the comparison circuit 770 informs the bit period storage circuit 730 that the correlation value at the timing later than the reproduction symbol clock by one sampling timing is the largest.

In addition, when the reproduction symbol clock is deviated like a reproduction symbol clock (c) in FIG. 13, for example, the comparison circuit 770 informs the bit period storage circuit 730 that the correlation value at the timing earlier than the reproduction symbol clock by one sampling timing is the largest.

When the bit period storage circuit 730 is informed that the correlation value at the timing later than the reproduction symbol clock by one sampling timing is the largest, the bit period storage circuit 730 increases the stored bit period. In addition, when the bit period storage circuit 730 is informed that the correlation value at the timing earlier than the reproduction symbol clock by one sampling timing is the largest, the bit period storage circuit 730 decreases is the stored bit period. The symbol clock reproduction circuit 740 performs the synchronization tracking operation by reproducing the symbol clock on the basis of the increased or decreased bit period.

Next, a configuration capable of performing the synchronization tracking operation by increasing or decreasing the bit period will be described.

In FIG. 13, it is assumed that the inferred bit period is 20 sampling clocks and the reproduction symbol clock is generated every five sampling clocks.

On the assumption that the reproduction symbol clock is output at the timing of the reproduction symbol clock (b), the bit period storage circuit 730 increases the stored bit period by performing the above-described circuit operation. For example, when the inferred bit period is increased by one sampling clock and becomes 21 sampling clocks, the symbol clock is generated at 5 sampling clocks in three times and generated at 6 sampling clocks in one time among four reproduction symbol clocks of 1 bit.

In addition, on the assumption that the reproduction symbol clock is output at the timing of the reproduction symbol clock (c), the bit period storage circuit 730 decreases the stored bit period by performing the above-described circuit operation. For example, when the inferred bit period is decreased by one sampling clock and becomes 19 sampling clocks, the symbol clock is generated at 5 sampling clocks in three times and generated at 4 sampling clocks in one time among four reproduction symbol clocks of 1 bit. In this way, by adjusting the symbol clock, the synchronization tracking operation is performed.

In addition, for example, it is assumed that the symbol clock is generated at 5 sampling clocks in two times and generated at 6 sampling clocks in the remaining two times among four reproduction symbol clock of 1 bit. In this case, when the sampling clock of 1 bit is distributed to 5→5→6→6, the symbol clocks in 1 bit may be deviated. Accordingly, the sampling clock is distributed to 6→5→5→6 or 5→6→6→5 so as to be centrosymmetric, a more ideal symbol clock can be generated.

A correction amount in a bit period correction operation may be a preset correction amount or a correction amount obtained by measuring and correcting an amount of a synchronization difference.

Moreover, it is possible to perform the synchronization tracking operation at higher speed by slowing timing at which the sampling clock starts to be counted, simultaneously with the increase or decrease of the inferred bit period. For example, the timing at which the sampling clock starts to be counted is slowed immediately before the inferred bit period is increased by one sampling clock. Alternatively, the timing at which the sampling clock starts to be counted is advanced immediately before the inferred bit period is decreased by one sampling clock. The timing for deviation is not limited to one sampling clock.

Upon increasing the inferred bit period continuously by the number or more of predetermined times, there is a possibility of an erroneous operation caused due to the noise or the like. Therefore, increasing the inferred bit period is stopped for the moment and then the synchronization tracking operation is re-started from the next timing. Upon stopping increasing the inferred bit period, decreasing the inferred bit period is not related.

Upon decreasing the inferred bit period continuously by the number or is more of predetermined times, there is a possibility of an erroneous operation caused due to the noise or the like. Therefore, decreasing the inferred bit period is stopped for the moment and then the synchronization tracking operation is re-started from the next timing. Upon stopping decreasing the inferred bit period, increasing the inferred bit period is not related.

Upon slowing the timing at which the bit period starts to be counted continuously by the number or more of predetermined times, there is a possibility of an erroneous operation caused due to the noise or the like. Therefore, slowing the timing at which the bit period starts to be counted is stopped for the moment and then the synchronization tracking operation is re-started from the next timing. Upon stopping slowing the timing at which the bit period starts to be counted, advancing the timing at which the bit period starts to be counted is not related.

Upon advancing the timing at which the bit period starts to be counted continuously by the number or more of predetermined times, there is a possibility of an erroneous operation caused due to the noise or the like. Therefore, advancing the timing at which the bit period starts to be counted is stopped for the moment and then the synchronization tracking operation is re-started from the next timing. Upon stopping advancing the timing at which the bit period starts to be counted, slowing the timing at which the bit period starts to be counted is not related.

After the bit period is initially inferred, the synchronization tracking operation is performed while increasing or decreasing the inferred bit period for a certain period. Subsequently, by fixing the inferred bit period until the reception completion and adjusting (adjusting the phase of the reproduction symbol clock) the timing at which the bit period starts to be counted, the synchronization tracking operation is performed. In this case, the synchronization tracking operation can be performed without the influence of a large noise, even when the large noise is generated after stability in the inference of the bit period. Upon fixing the bit period, an average of the bit period inferred until the fixation of the bit period may be calculated for use. In addition, when the certain period is set to a period of time obtained until the preamble arrives, a precision of the inference of the bit period can be improved by a certain waveform immediately before the preamble.

Moreover, it is possible to improve the precision of the inference of the bit period by providing a filter for the output of the comparison circuit 770 and removing jitter of the timing signal giving the maximum correlation value output by the comparison circuit 770. As the filter, a random work filer may be used.

Even in the cases of the setting value M=4 and the setting value M=8, the synchronization tracking operation can be performed in the above-described manner.

Fourth Embodiment

Figure 14:
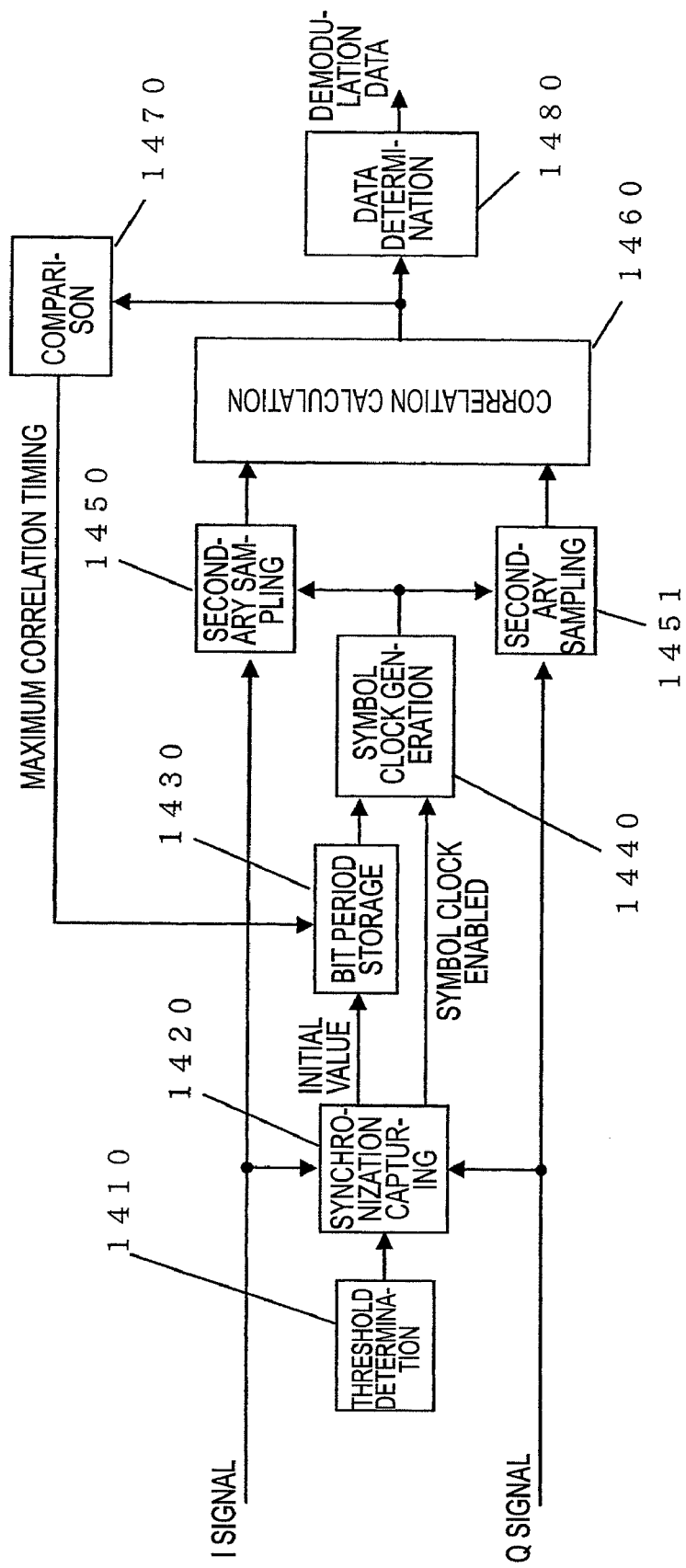
FIG. 14 is a diagram illustrating the configuration of a demodulation circuit including a synchronization tracking circuit according to a fourth embodiment of the invention.
Figure 15:
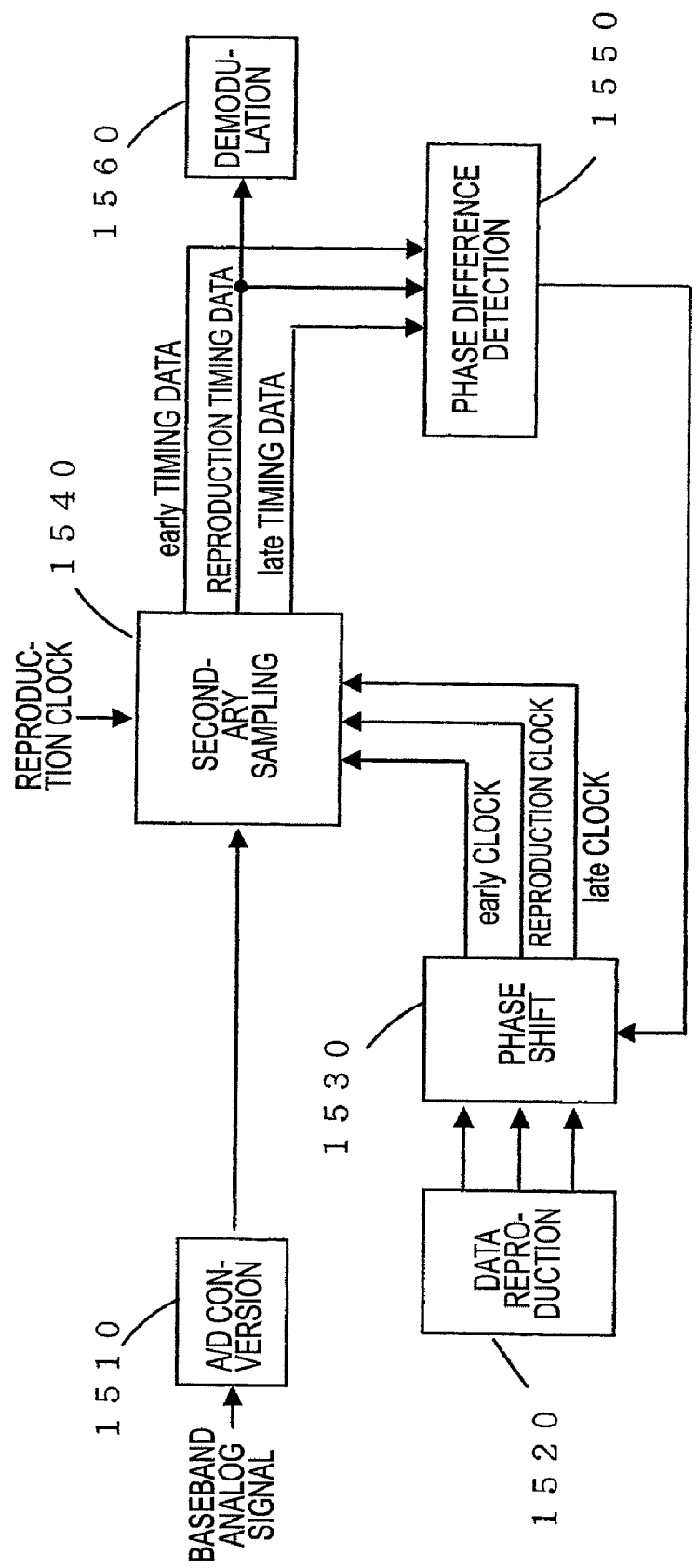
FIG. 15 is a diagram illustrating the configuration of a known synchronization tracking circuit.
Figure 16:
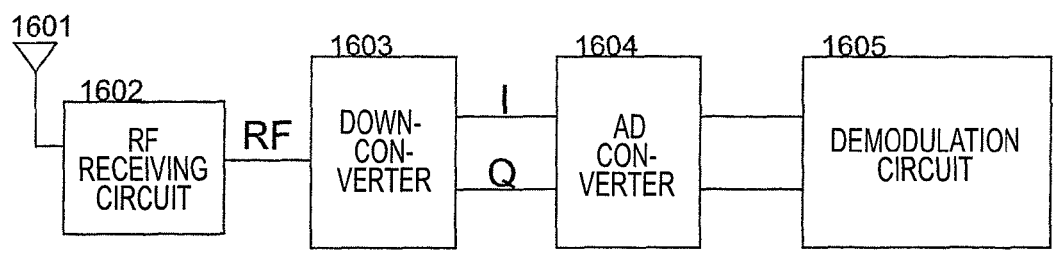
FIG. 16 is a diagram illustrating a hardware configuration of a conventional demodulation circuit.
Figure 17:
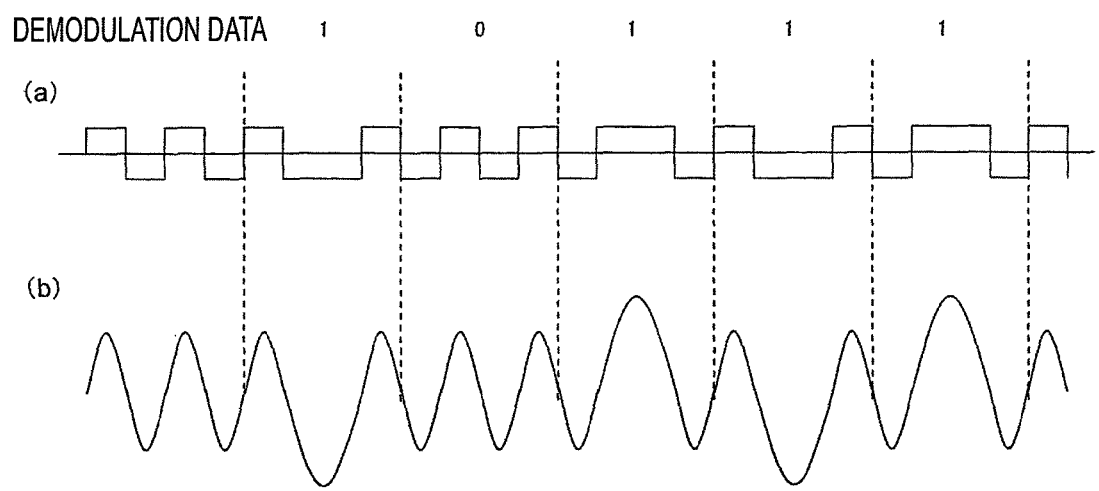
FIG. 17 (a), (b) are received waveform diagrams of a mirror sub-carrier in a case of M=2.

FIG. 14 is a diagram illustrating the configuration of a demodulation circuit including a synchronization tracking circuit according to a fourth embodiment of the invention.

In FIG. 14, Reference Numeral 1410 denotes a threshold storage circuit that stores a threshold used to detect a desired signal. Reference Numeral 1420 denotes a synchronization capturing circuit which inputs received I and Q signals and thresholds, captures initial synchronization for the received signals, and outputs an inferred bit period and symbol timing. Reference Numeral 1430 denotes a bit period storage circuit that stores the inferred bit period and increases or decreases a value of the stored bit period when a control signal is input. Reference Numeral 1440 denotes a symbol clock reproduction circuit which outputs a symbol clock on the basis of the symbol timing output from the synchronization capturing circuit 1420 and the inferred bit period stored in the bit period storage circuit 1430.

Reference Numerals 1450 and 1451 denote secondary sampling circuits which sample the I and Q signals using the reproduction symbol clock output by the symbol clock generation circuit 1440. Reference Numeral 1460 denotes a correlation calculation circuit that performs a correlation calculation on the data sampled by the secondary sampling circuits 1450 and 1451. Reference Numeral 1470 denotes a comparison circuit that compares largeness and smallness of correlation values output from the correlation calculation circuit 1460. Reference Numeral 1480 denotes a data determination circuit that determines data on the basis of the correlation values output from the correlation calculation circuit 1460 and outputs demodulation data.

Operations of the demodulation circuit with the above-described configuration illustrated in FIG. 14 will be described.

First, when the reader/writer is switched to a reception mode, the threshold determination circuit 1410 determines the threshold and the synchronization capturing circuit 1420 captures an initial operation. When signs determined upon transmitting signals from a tag to the reader/writer are set by signs of the mirror sub-carrier, head portions of the I and Q signals received in the reader/writer have a waveform in which positives and negatives are periodically repeated. Accordingly, by detecting the periodic repetition, the initial synchronization is captured. A synchronization circuit is the same as that according to the third embodiment.

When the initial synchronization is established, a synchronization tracking operation starts so as to cause deviation of the synchronization. Hereinafter, the synchronization tracking operation will be described in detail.

A symbol clock reproduction circuit 1440 receives an enable signal from the synchronization capturing circuit 1420 and then outputs the symbol clock at the calculated interval using the inferred bit period stored in the bit period storage circuit 1430. The intervals for outputting the symbol clock are obtained by dividing the inferred bit period by 4, 8, and 16 for the setting values M=2, 4, and 8, respectively. At this time, when the divided result is not divided, all remaining clocks are distributed if possible.

The secondary sampling circuits 1450 and 1451 sample the I and Q signals at the symbol clock and timings before and after the symbol clock on the basis of the reproduced symbol clock. The correlation calculation circuit 1460 performs a correlation calculation at three timings, that is, the symbol clock and the timings before and after the symbol clock. The calculation expression needs to represent a larger correlation value as the synchronization is more precise like the third embodiment. The data determination circuit 1480 determines the data in the same manner as that according to the third embodiment. In addition, the comparison circuit 1470 compares the largeness and smallness of the absolute value of the correlation value at each timing like the third embodiment and outputs a control signal for informing at which timing the correlation values is the largest.

For example, when the reproduction symbol clock is deviated like the reproduction symbol clock (b) in FIG. 13, the comparison circuit 1470 informs the bit period storage circuit 1430 that the correlation value at the timing later than the reproduction symbol clock by one sampling timing is the largest. In addition, when the reproduction symbol clock is deviated like the reproduction symbol clock (c) in FIG. 13, the comparison circuit 1470 informs the bit period storage circuit 1430 that the correlation value at the timing earlier than the reproduction symbol clock by one sampling timing is the largest. When the bit period storage circuit 1430 is informed that the correlation value at the timing later than the reproduction symbol clock by one sampling timing is the largest, the bit period storage circuit 1430 increases the stored bit period. In addition, when the bit period storage circuit 1430 is informed that the correlation value at the timing earlier than the reproduction symbol clock by one sampling timing is the largest, the bit period storage circuit 1430 decreases the stored bit period.

The symbol clock reproduction circuit 1440 performs the synchronization tracking operation by reproducing the symbol clock on the basis of the increased or decreased bit period. A configuration capable of performing the synchronization tracking operation by increasing or decreasing the bit period is performed in the same manner as that according to the third embodiment.

According to the above-described embodiments, the synchronization tracking circuit and the demodulation circuit including the synchronization tracking circuit are capable of realizing the synchronization capturing operation and the synchronization tracking operation with high precision by inferring the bit period from the received signals, even when the large clock difference (about 0 to 20%) between a transmission unit and a reception unit.

The symbol clock reproduction circuit is capable of reproducing the symbol clock from the inferred bit period by almost equally distributing the inferred bit period by the number of symbols near 1 bit and outputting the symbol clocks at the distributed intervals.

In the symbol clock reproduction circuit, when the number of clocks representing the inferred bit period is not completely divided by the number of symbols corresponding to 1 bit, the remaining clocks are divided so as to be centrosymmetric in 1 bit and the symbol clocks are output. In this way, it is possible to prevent the difference of the symbol clocks in 1 bit as minimum as possible.

The symbol clock reproduction circuit is capable of performing the synchronization tracking operation on the received signals by adjusting the phase of the reproduction symbol clocks on the basis of the signal for informing timing at which the maximum correlation value output from the comparison circuit is given.

The bit period storage circuit is capable of adjusting the symbol clock timing by increasing or decreasing the inferred bit period on the basis of the timing signal for giving the maximum correlation value informed by the comparison circuit, and performing the synchronization tracking operation at high speed and in wide range.

It is possible to prevent the inferred bit period from varying due to a noise or the like by performing the synchronization tracking operation while increasing or decreasing the inferred bit period during a certain period of time after the completion of the synchronization capturing operation, and then adjusting the phase of the reproduction symbol clock while fixing the bit period until the end of the reception.

It is possible to prevent the inferred bit period from varying due to a noise or the like by performing the synchronization tracking operation while increasing or decreasing the inferred bit period until the preamble arrives, and then adjusting the phase of the reproduction symbol clock while fixing the bit period until the end of the reception.

It is possible to prevent the inferred bit period from varying due to a noise or the like by establishing synchronization, performing the synchronization tracking operation while averaging the inferred bit period, fixing the inferred bit period when the increasing or decreasing degree of the bit period is within a certain range, and then adjusting the phase of the reproduction symbol clock until the end of the reception.

It is possible to simplify the circuit by slowing the symbol clock by predetermined time at a time point at which the inferred bit period is increased and advancing the symbol clock by predetermined time at a time point at which the inferred bit period is decreased, in order to set an adjustment width of the symbol clock in advance.

It is possible to perform the synchronization tracking operation with more precision by monitoring the amount of synchronization difference, requesting the a correction degree corresponding to the amount of synchronization difference, slowing the symbol clock by the correction degree at the time point at which the inferred bit period is increased, and advancing the symbol clock by the requested correction degree at the time point at which the inferred bit period is decreased, in order to correct a degree corresponding to the amount of synchronization difference.

It is possible to realize the more precise synchronization tracking operation by providing the filter such as a random work filter for the output of the comparison circuit and removing the jitter of the timing signal giving the maximum correlation value output by the comparison circuit.

The synchronization capturing circuit is capable of detecting the desired signal and starting the synchronization tracking operation and the demodulation operation by detecting the peak value exceeding the predetermined threshold for the composite waveform of the received I and Q signals, considering the synchronization to be established when the adjacent peak intervals are within the certain range, and outputting the timing of the peak value and the inferred bit period.

The synchronization capturing circuit is capable of detecting the desired signal and starting the synchronization tracking operation and the demodulation operation by detecting the peak value exceeding the predetermined threshold for the composite waveform of the received I and Q signals, considering the synchronization to be established when the adjacent peak intervals are within the certain range, and outputting the timing of the peak value and the inferred bit period.

The synchronization capturing circuit is capable of detecting the desired signal and starting the synchronization tracking operation and the demodulation operation by automatically setting the threshold for the composite waveform of the received I and Q signals, detecting the peak value exceeding the predetermined threshold, considering the synchronization to be established when the adjacent peak intervals are within the certain range, and outputting the timing of the peak value and the inferred bit period.

The synchronization capturing circuit is capable of detecting the desired signal and starting the synchronization tracking operation and the demodulation operation by automatically setting the threshold for the composite waveform of the received I and Q signals, detecting the peak value exceeding the predetermined threshold, considering the synchronization to be established when the continuous plurality of peak intervals are within the certain range, and outputting the timing of the peak value and the inferred bit period.

By setting the composite waveform of the received I or Q signal to be $|I(n)|+|Q(n)|$ or $|I(n)+I(n+1)|+|Q(n)+Q(n+1)|$, it is possible to capture the synchronization using the simplified circuit even when the received I or Q signal has any phase.

By setting the composite waveform of the received I or Q signal to be $I(n)^2+Q(n)^2$ or $(I(n)+I(n+1))^2+(Q(n)+Q(n+1))^2$, it is possible to capture the synchronization using the simplified circuit even when the received I or Q signal has any phase.

By detecting the noise level during no signal period immediately before return of the response from each tag and automatically setting the value larger than the maximum value as the threshold, it is possible to reduce the influence of the noise in the synchronization capturing operation.

By detecting the noise level whenever the antennas are switched, it is possible to reduce the influence of the noise on the synchronization capturing is operation.

By repeatedly detecting the noise level when no response is received from each tag for the certain period of time, it is possible to reduce the influence of the noise on the synchronization capturing operation.

By detecting the signal level received from each tag and automatically setting the threshold corresponding to the signal level whenever the signal level is detected, it is possible to reduce the influence of the noise on the synchronization capturing operation.

It is possible to performing the synchronization capturing operation with high precision by monitoring the signal level of the burst portion of the preamble in the signal received from each tag for the arbitrary period of time and automatically setting the value smaller than the maximum value during the monitoring period as the threshold, in order to set the threshold corresponding to the intensity of the reception signal.

It is possible to performing the synchronization capturing operation with high precision by adding the pilot tone to the response of each tag, monitoring the signal level of the pilot tone for the arbitrary period of time, and automatically setting the value smaller than the maximum value during the monitoring period as the threshold in order to set the threshold corresponding to the intensity of the reception signal.

It is possible to performing the synchronization capturing operation with high precision by setting the threshold as ½ of the maximum value of the reception signal monitored and detected in order to set the threshold corresponding to the intensity of the reception signal.

It is possible to performing the synchronization capturing operation with high precision by detecting the arbitrary peak values of the burst portion of the preamble in the signal received from each tag and automatically setting the value smaller than the average value of the plurality of peak values in order to set the threshold corresponding to the intensity of the reception signal.

It is possible to performing the synchronization capturing operation with high precision by adding the pilot tone to the response from each tag, detecting the arbitrary peak values of the pilot tone and automatically setting the value smaller than the average value of the plurality of peak values in order to set the threshold corresponding to the intensity of the reception signal. It is possible to performing the synchronization capturing operation with high precision by setting threshold as ½ of the average value of the plurality of detected peak values in order to set the threshold corresponding to the intensity of the reception signal.

Upon performing the synchronization tracking operation with the setting value M=2 in the mirror sub-carrier, it is possible to simultaneously perform the synchronization tracking operation and the data demodulation calculation using the absolute value of the correlation values and the signs by obtaining the correlation expression used for the correlation calculation circuit with calculation of the inner product of the two first half pairs of resultant vectors and the two second half pairs of resultant vectors using the four pairs of (I, Q) data of 1 bit sampled by the secondary sampling circuit.

Upon performing the synchronization tracking operation with the setting value M=4 in the mirror sub-carrier, it is possible to simultaneously perform the synchronization tracking operation and the data demodulation calculation using the absolute value of the correlation values and the signs by obtaining is the correlation expression used for the correlation calculation circuit with calculation of the inner product of the four first half pairs of resultant vectors and the four second half pairs of resultant vectors using the eight pairs of (I, Q) data of 1 bit sampled by the secondary sampling circuit.

Upon performing the synchronization tracking operation with the setting value M=8 in the mirror sub-carrier, it is possible to simultaneously perform the synchronization tracking operation and the data demodulation calculation using the absolute value of the correlation values and the signs by obtaining the correlation expression used for the correlation calculation circuit with calculation of the inner product of the eight first half pairs of resultant vectors and the eight second half pairs of resultant vectors using the sixteen pairs of (I, Q) data of 1 bit sampled by the secondary sampling circuit.

Upon advancing the reproduction symbol clock continuously the certain number of times, it is possible to prevent erroneous correction of the reproduction symbol clock by stopping advancing the reproduction symbol clock at the correction time point of the reproduction symbol clock for the certain period of time of the next time or the subsequent time.

Upon slowing the reproduction symbol clock continuously the certain number of times, it is possible to prevent erroneous correction of the reproduction symbol clock by stopping slowing the reproduction symbol clock at the correction time point of the reproduction symbol clock for the certain period of time of the next time or the subsequent time.

Upon increasing the inferred bit period continuously the certain number of times, it is possible to prevent erroneous correction of the inferred bit period by stopping increasing the inferred bit period at the correction time point of the inferred bit period for the certain period of time of the next time or the subsequent time.

Upon decreasing the inferred bit period continuously the certain number of times, it is possible to prevent erroneous correction of the inferred bit period by stopping decreasing the inferred bit period at the correction time point of the inferred bit period for the certain period of time of the next time or the subsequent time.

According to the invention, a mirror sub-carrier demodulation circuit and a receiving device including the mirror sub-carrier demodulation circuit are useful for a demodulation circuit of a receiving device used in RFID communication or the like.

This application claims the benefit of Japanese Patent application No. 2007-261750 filed on Oct. 5, 2007 and Japanese Patent application No. 2007-263112 filed on Oct. 9, 2007, the entire contents of which are incorporated herein by reference.

What is claimed is:

1. A mirror sub-carrier demodulation circuit for receiving and demodulating data of a mirror sub-carrier, comprising:
   a waveform generation unit, generating a composite waveform of received I and Q signals;
   a peak detection unit, detecting peak a value of the composite waveform generated by the waveform generation unit;
   a peak interval detection unit, detecting an interval of the peak value detected by the peak detection unit and generating timing at which the received data is input;
   a storage unit, storing I data and Q data at the timing generated by the peak interval detection unit;
   a correlation calculation unit, performing a correlation calculation using the I data and the Q data of the storage unit which are obtained on the basis of a setting value M of the mirror sub-carrier during a 1-bit period; and
   a data determination unit, determining data of 0 or 1 from the result calculated by the correlation calculation unit.

2. The mirror sub-carrier demodulation circuit according to claim 1,
   wherein the correlation calculation unit performs the correlation calculation with an expression $(I1-I2)(I3-I4)+(Q1-Q2)(Q3-Q4)$ in a case of the setting value M=2, where I1 to I4 each represent a data value of in-phase signal I at timepoints 1 to 4, respectively, and Q1 to Q4 each represent a data value of quadrature signal Q at timepoints 1 to 4, respectively.

3. The mirror sub-carrier demodulation circuit according to claim 1,
   wherein the correlation calculation unit performs the correlation calculation with an expression $(I1-I2+I3-I4)(I5-I6+I7-I8)+(Q1-Q2+Q3-Q4)(Q5-Q6+Q7-Q8)$ in a case of the setting value M=4, where I1 to I8 each represent a data value of in-phase signal I at timepoints 1 to 8, respectively, and Q1 to Q8 each represent a data value of quadrature signal Q at timepoints 1 to 8, respectively.

4. The mirror sub-carrier demodulation circuit according to claim 1,
   wherein the correlation calculation unit performs the correlation calculation with an expression $(I1-I2+I3-I4+I5-I6+I7-I8)(I9-I10+I11-I12+I13-I14+I15-I16)+(Q1-Q2+Q3-Q4+Q5-Q6+Q7-Q8)(Q9-Q10+Q11-Q12+Q13-Q14+Q15-Q16)$ in a case of the setting value M=8, where I1 to I16 each represent a data value of in-phase signal I at timepoints 1 to 16, respectively, and Q1 to Q16 each represent a data value of quadrature signal Q at timepoints 1 to 16, respectively.

5. The mirror sub-carrier demodulation circuit according to claim 1,
   wherein the data determination unit sets a most significant bit of the correlation calculation unit as demodulation data having the 1-bit period.

6. The mirror sub-carrier demodulation circuit according to claim 1,
   wherein after the peak detection unit detects peaks of the composite waveform in a burst signal of the first half of a preamble and measures intervals of the plurality of continuous peaks by a counter of an arbitrary period and sets an average time (count number) of the intervals as a symbol acquisition period, the peak detection unit detects the next peak within an arbitrary time between the previous and next arbitrary times with reference to time set from the detected peaks.

7. The mirror sub-carrier demodulation circuit according to claim 6, wherein the peak detection unit sets as a peak of a waveform a time point at which variation in two continuous sampling data is turned from increase to decrease.

8. The mirror sub-carrier demodulation circuit according to claim 6,
   wherein the peak detection unit sets as a peak of a waveform a time point at which three or more continuous sampling data increase in succession and then three or more continuous sampling data decrease in succession.

9. The mirror sub-carrier demodulation circuit according to claim 1,
   wherein in a communication where a pilot tone is added to a response from a communication opponent, when the peak detection unit detects peaks of the composite waveform with the pilot tone and measures intervals of the plurality of continuous peaks by a counter of an arbitrary period and sets an average time (count number) of the intervals as a symbol acquisition period, the peak detection unit detects the next peak within an arbitrary time between the previous and next arbitrary times with reference to time set from the detected peaks.

10. The mirror sub-carrier demodulation circuit according to claim 1,
    wherein the peak detection unit detects only peaks of the I and Q signals having levels larger than an arbitrary threshold value.

11. The mirror sub-carrier demodulation circuit according to claim 10,
    wherein on the basis of a noise level detected before receiving a signal from the communication opponent, the peak detection unit sets a level larger than the noise level as the threshold value.

12. The mirror sub-carrier demodulation circuit according to claim 1, wherein the composite waveform generated by the waveform generation unit is one of $In^2+Qn^2$, $|In|+|Qn|$, and $|In+In+1|+|Qn+Qn+1|$, where In represents a data value of in-phase signal I at a designated timepoint n, and Qn represents a data value of quadrature signal Q at the designated timepoint n.

13. A receiving device, comprising the mirror sub-carrier demodulation circuit according to claim 1.

14. A mirror sub-carrier demodulation circuit for receiving and demodulating data of a mirror sub-carrier, comprising:
    a waveform generation unit, generating a composite waveform of received I and Q signals;

a peak detection unit, detecting a peak value of the composite waveform generated by the waveform generation unit;

a peak interval detection unit, detecting an interval of the peak values detected by the peak detection unit and generates timing at which the received data is input;

a storage unit, storing I data and Q data at the timing generated by the peak interval detection unit;

a correlation calculation unit, performing a correlation calculation using the I data and the Q data of the storage unit obtained during a 1-bit period; and a data determination unit, determining data of 0 or 1 from the result calculated by the correlation calculation unit, wherein the correlation calculation unit performs the correlation calculation so that a difference between calculation results obtained when the data to be determined is 0 and when the data to be determined is 1 is the largest.

15. A mirror sub-carrier demodulating method of receiving and demodulating data of a mirror sub-carrier, the method comprising:

generating a composite waveform of received I and Q signals;

detecting a peak value of the composite waveform;

detecting an interval between the detected peak value;

generating timing at which the receive data is input;

storing the I data and Q data at the timing;

performing a correlation calculation on the basis of a setting value M of the mirror sub-carrier using the I data and the Q data stored during a 1-bit period; and determining data of 0 or 1 from the calculation result.

* * * * *